United States Patent [19]
Willener et al.

[11] Patent Number: 6,115,954
[45] Date of Patent: Sep. 12, 2000

[54] COLLECTION ASSEMBLIES AND METHODS FOR USE IN HARVESTING BRINE SHRIMP EGGS

[76] Inventors: John A. Willener, 5415 S. 7500 West, Hooper, Utah 84315; John A. Willener, Jr., 2201 N. 750 West, Clinton, Utah 84015

[21] Appl. No.: 09/018,157

[22] Filed: Feb. 3, 1998

Related U.S. Application Data

[63] Continuation-in-part of application No. 08/760,478, Dec. 5, 1996, Pat. No. 5,890,311.
[60] Provisional application No. 60/008,323, Dec. 7, 1995, and provisional application No. 60/008,330, Dec. 7, 1995.

[51] Int. Cl.⁷ .......................... A01K 74/00; A01K 79/00
[52] U.S. Cl. .......................... 43/6.5; 43/4.5; 43/4; 56/8; 56/9; 210/242.3; 210/776; 210/923
[58] Field of Search .................. 43/4, 4.5, 6.5; 210/923, 776, 242.3, 242.1; 56/8, 9, DIG. 2; 114/255

[56] References Cited

U.S. PATENT DOCUMENTS

| | | |
|---|---|---|
| 1,061,082 | 5/1913 | Kahrs . |
| 1,486,485 | 3/1924 | Frissell . |
| 1,591,024 | 7/1926 | Dodge . |
| 2,081,146 | 5/1937 | Herrington ................... 43/9 |
| 2,330,508 | 9/1943 | McColl ..................... 210/44 |
| 2,786,542 | 3/1957 | Orfei et al. ................ 182/26 |
| 2,786,592 | 3/1957 | Laham ..................... 215/28 |
| 2,804,045 | 8/1957 | Scott ...................... 119/2 |
| 2,832,168 | 4/1958 | Brown ..................... 43/17.1 |
| 2,920,606 | 1/1960 | Anderson ................... 119/2 |
| 2,984,207 | 5/1961 | Drake ..................... 119/2 |
| 3,029,784 | 4/1962 | Elbreder et al. ............. 119/2 |
| 3,086,497 | 4/1963 | Novello .................... 119/2 |
| 3,184,923 | 5/1965 | Galvaing .................. 61/1 |
| 3,347,029 | 10/1967 | Grinwald ................... 56/9 |
| 3,534,859 | 10/1970 | Amero et al. .............. 210/242 |
| 3,539,013 | 11/1970 | Smith ..................... 210/242 |
| 3,541,769 | 11/1970 | Grinwald ................... 56/9 |
| 3,592,006 | 7/1971 | Crucet ..................... 61/1 |
| 3,604,395 | 9/1971 | Huslin ..................... 119/2 |
| 3,631,679 | 1/1972 | Fisch ...................... 61/1 |
| 3,661,263 | 5/1972 | Peterson et al. ............ 210/242 |
| 3,669,074 | 6/1972 | Stasio ..................... 119/2 |
| 3,673,986 | 7/1972 | Braunhut ................... 119/2 |
| 3,678,899 | 7/1972 | Lovitz ..................... 119/2 |

(List continued on next page.)

FOREIGN PATENT DOCUMENTS

| | | |
|---|---|---|
| 695641 | 8/1953 | Denmark . |
| 0 104 702 | 4/1984 | European Pat. Off. . |
| 2229260 | 12/1974 | France . |
| 480673 | 7/1953 | Italy . |

OTHER PUBLICATIONS

International Aquaculture Technologies, "Providing Superior Artemia Through Advanced Technology," RS No. 753.
Packet of advertising literature for the "skim-pak™", produced by Douglas Engineering, a Division of U.S. Hydrex, Inc., Walnut Creek, California.
All information contained in the enclosed Information Disclosure Statement dated Jul. 30, 1997 from parent application Serial No. 08/760,478.

*Primary Examiner*—Jack W. Lavinder
*Attorney, Agent, or Firm*—Kirton & McConkie; Dale E. Hulse; Berne S. Broadbent

[57] ABSTRACT

A collection assembly for harvesting brine shrimp eggs from a body of water is disclosed in one presently preferred embodiment of the present invention as comprising a base member which may be positioned in a substantially horizontal orientation, means for extracting the brine shrimp eggs from the body of water, and means for positioning the extraction means such that the extraction means is at least three inches vertically from the base member. In one presently preferred embodiment, the collection assembly includes a back wall positioned at an angle to the base member. The back wall may be connected to and positioned substantially perpendicular to the base member so as to form an L-shape.

21 Claims, 9 Drawing Sheets

U.S. PATENT DOCUMENTS

| | | | |
|---|---|---|---|
| 3,688,909 | 9/1972 | Titus et al. | 210/242 |
| 3,698,163 | 10/1972 | Kelpin | 56/9 |
| 3,700,108 | 10/1972 | Richards | 210/242 |
| 3,700,109 | 10/1972 | Lasko | 210/242 |
| 3,716,142 | 2/1973 | Bianchi | 210/242 |
| 3,738,316 | 6/1973 | Stasio | 119/2 |
| 3,745,115 | 7/1973 | Olsen | 210/83 |
| 3,748,264 | 7/1973 | McCombie | 210/65 |
| 3,757,953 | 9/1973 | Sky-Eagle, Jr. | 210/242 |
| 3,759,390 | 9/1973 | McCombie | 210/242 |
| 3,762,558 | 10/1973 | Anderson | 210/242 |
| 3,768,193 | 10/1973 | London | 43/6.5 |
| 3,815,751 | 6/1974 | Pavlovic | 210/242 |
| 3,880,624 | 4/1975 | Arnold | 55/242 |
| 3,921,407 | 11/1975 | Neal | 61/1 |
| 3,923,661 | 12/1975 | Crisafulli | 210/242 |
| 3,970,556 | 7/1976 | Gore | 210/83 |
| 3,983,034 | 9/1976 | Wilson | 210/73 |
| 4,006,082 | 2/1977 | Irons | 210/83 |
| 4,019,227 | 4/1977 | Ebata | 24/205.16 R |
| 4,051,038 | 9/1977 | in't Veld | 210/242 |
| 4,059,962 | 11/1977 | Milgram | 61/1 F |
| 4,073,143 | 2/1978 | Preus | 61/1 F |
| 4,104,884 | 8/1978 | Preus | 61/1 F |
| 4,116,007 | 9/1978 | Stagemeyer et al. | 405/66 |
| 4,117,726 | 10/1978 | McGroddy | 73/421 R |
| 4,124,981 | 11/1978 | Preus | 405/66 |
| 4,146,477 | 3/1979 | Challener | 210/143 |
| 4,175,347 | 11/1979 | Puretic | 43/6.5 |
| 4,205,626 | 6/1980 | Muchmore et al. | 119/3 |
| 4,208,287 | 6/1980 | Brieck | 210/242 S |
| 4,264,444 | 4/1981 | Bronnec | 210/242.3 |
| 4,340,321 | 7/1982 | Maheshwary et al. | 405/66 |
| 4,388,188 | 6/1983 | Morris | 210/242.3 |
| 4,405,458 | 9/1983 | McHugh, Jr. | 210/242.3 |
| 4,434,572 | 3/1984 | Sheldon et al. | 43/6.5 |
| 4,458,621 | 7/1984 | De Clifford | 114/255 |
| 4,511,470 | 4/1985 | Ayroldi | 210/242.3 |
| 4,610,794 | 9/1986 | Tsahalis | 210/776 |
| 4,826,362 | 5/1989 | Hayashi | 406/109 |
| 4,839,062 | 6/1989 | Sanders | 210/776 |
| 4,998,369 | 3/1991 | Lamon | 43/6.5 |
| 5,002,430 | 3/1991 | Smith | 405/66 |
| 5,042,187 | 8/1991 | Bentzley | 43/6.5 |
| 5,071,286 | 12/1991 | Separovich | 405/66 |
| 5,102,540 | 4/1992 | Conradi et al. | 210/232 |
| 5,160,432 | 11/1992 | Gattuso | 210/242.3 |
| 5,165,174 | 11/1992 | Brown, Jr. | 43/6.5 |
| 5,209,005 | 5/1993 | Krager | 43/7 |
| 5,253,953 | 10/1993 | Whidden, Jr. | 405/63 |
| 5,361,528 | 11/1994 | Peacock | 43/6.5 |
| 5,457,908 | 10/1995 | Sanders | 43/6.5 |
| 5,491,922 | 2/1996 | Sanders | 43/6.5 |
| 5,513,462 | 5/1996 | Lamon | 43/6.5 |
| 5,522,674 | 6/1996 | Cooper | 405/63 |
| 5,553,972 | 9/1996 | Bergeron et al. | 405/60 |
| 5,564,448 | 10/1996 | Lincoln | 134/166 |
| 5,566,492 | 10/1996 | Swenson | 43/6.5 |
| 5,580,185 | 12/1996 | Ware | 405/72 |
| 5,660,196 | 8/1997 | Bein | 134/129 |
| 5,688,075 | 11/1997 | Gradek | 405/63 |
| 5,768,820 | 6/1998 | Bentzley | 43/6.5 |
| 5,890,311 | 4/1999 | Willener et al. | 43/4.5- |

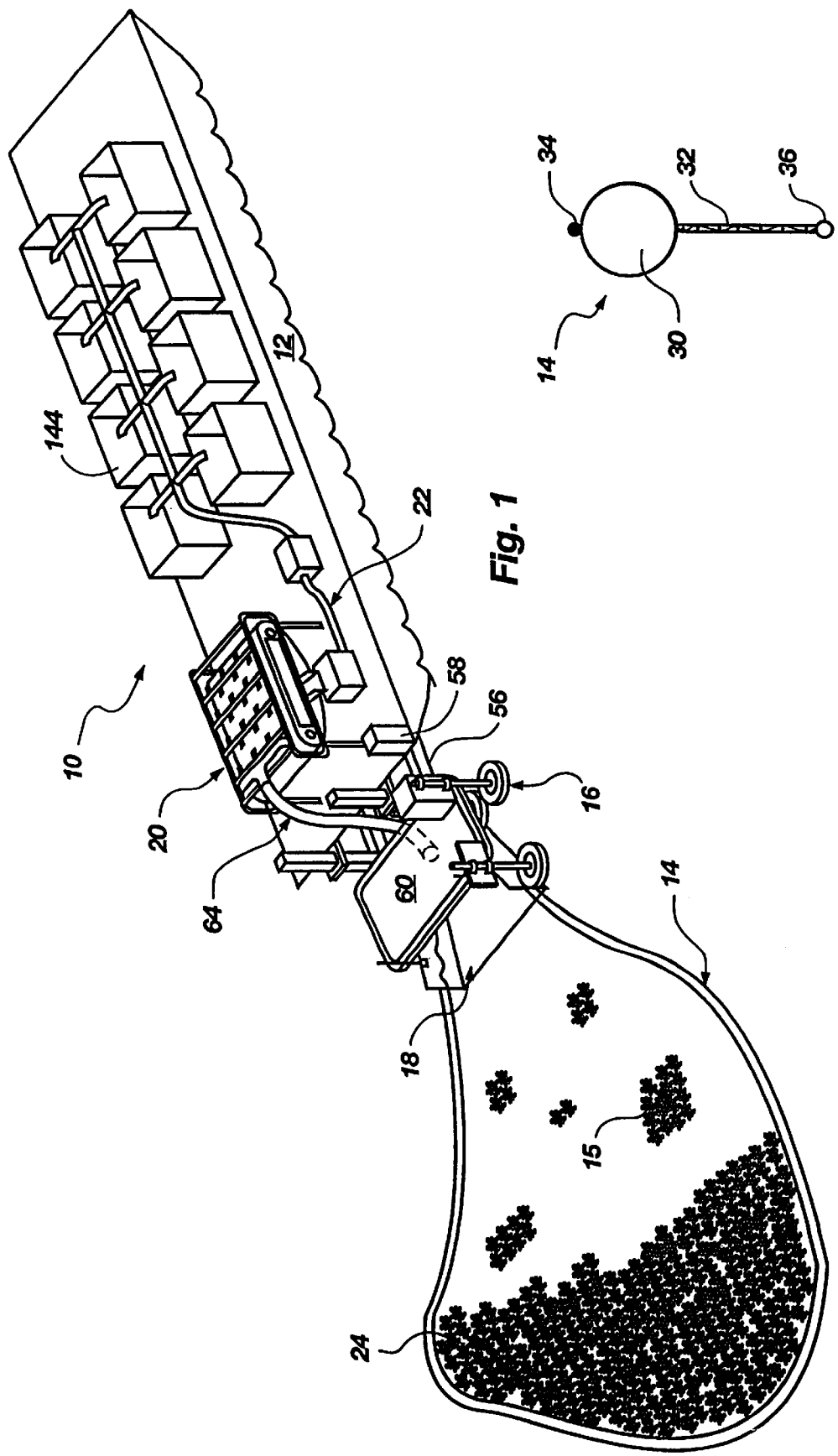

COLLECTION ASSEMBLIES AND METHODS FOR USE IN HARVESTING BRINE SHRIMP EGGS

RELATED APPLICATIONS

This application is a continuation-in-part of application Ser. No. 08/760,478, filed on Dec. 5, 1996, now U.S. Pat. No. 5,890,311 for "APPARATUS AND METHODS FOR HARVESTING AND CLEANING BRINE SHRIMP EGGS," the content of which is incorporated herein by reference, which in turn is a continuation-in-part of provisional application Ser. No. 60/008,323, filed on Dec. 7, 1995 for "APPARATUS AND METHODS FOR HARVESTING AND CLEANING SHRIMP EGGS," the content of which is incorporated herein by reference, and provisional application Ser. No. 60/008,330, filed on Dec. 7, 1995 for "CONTAINMENT BOOM APPARATUS," the content of which is incorporated herein by reference. The priority of each of the foregoing applications is claimed under U.S.C. § 119(e) and 35 U.S.C. § 120.

BACKGROUND

1. The Field of the Invention

This invention relates to collecting substances and/or materials from a body of water and, more particularly, to novel systems and methods for harvesting and cleaning brine shrimp eggs on the open water.

2. The Background Art

As classified, brine shrimp are branchiopod crustaceans of the genus Artemia which commonly inhabit strongly saline environments, such as salty lakes and brine pools which exist throughout the world. The Great Salt Lake located in the state of Utah is an example of such a concentrated saline body of water which provides a rich environment where brine shrimp may flourish. One of the predominant species of brine shrimp commonly found in vast numbers on the Great Salt Lake is the species *Artemia salina*.

Measuring on the average of approximately one centimeter in length, brine shrimp primarily feed on free floating algae and other microscopic organisms found in hypersaline lakes and ponds. Typically during natural growth, brine shrimp acquire a shell which develops over a portion of their body and which is generally shed periodically throughout the life cycle of the brine shrimp to allow for additional growth. The shell casings discarded from brine shrimp are then deposited in the sur rounding waters and become a part of a conglomeration of floating debris generally contiguous the brine shrimp.

Normally reaching sexual maturity within approximately three weeks after hatching, brine shrimp generally reproduce about every fourth day, which may sometimes last for as long as an eight month period. Brine shrimp eggs (or cysts) are, accordingly, deposited in surrounding waters and become a part of the conglomeration of floating debris generally contiguous the brine shrimp In some hypersaline bodies of water, such as the Great Salt Lake, brine shrimp eggs do not hatch during a period of several months of the year, primarily as a result of a period of physiologically enforced dormancy or diapause. In this regard, naturally occurring brine shrimp eggs are usually found with debris floating at or near the surface of a body of water in a mixture which is typically blown by the wind and carried by the water currents to the surrounding shoreline beaches.

Floating in a natural state at or near the surface of the water, brine shrimp eggs are routinely discovered in a mixture consisting, in a large part, of live and dead brine shrimp, discarded brine shrimp shell casings, brine fly casings, wood pieces, tumbleweed, twigs, trash, dead waterfowl, and/or other types of floating debris. After separating the deposited brine shrimp eggs from this mixture of floating debris, the brine shrimp eggs, under examination, typically resemble fine granules of sand as a result of their inherently diminutive size. For example, an ounce of salt water extracted from the Great Salt Lake may contain up to several million brine shrimp eggs.

Historically, the eggs of brine shrimp are collected, cleaned, dried, and packaged for storage so as to provide a general source of commercial fish food. After brine shrimp eggs have been processed, dried, and packaged, even after several years in storage, the eggs may be immersed in salt water for a period of about twenty-four hours and free-swimming larvae will usually emerge due to the tremendous resilience of brine shrimp eggs. Similarly, brine shrimp eggs may be hatched and used as an excellent food source for feeding fish an/or other small aquatic animals in saltwater and/or freshwater aquariums. Because brine shrimp eggs have the capability of being stored for several years as a packaged commodity, brine shrimp eggs have become a valuable resource of commercial fish food which is very much in demand throughout the world.

Consistent with the foregoing, those skilled in the art developed techniques and methods to assist in harvesting brine shrimp eggs from the shoreline of a hypersaline body of water. Traditionally, shovels and various netting apparatus were utilized along the shorelines to collect the free-floating mixture of brine shrimp eggs and debris. Shoreline harvesting methods and apparatus of the prior art, however, incorporate many disadvantages. For example, one of the most significant disadvantages associated with prior art shoreline harvesting techniques and methods is the conditions of the harvest being ultimately influenced by the weather in relation to its inherent control as to where, when, and if the brine shrimp eggs are deposited along the shoreline.

Another meaningful disadvantage with regards to shoreline harvesting methods and apparatus of the prior art includes the considerable amount of manual labor typically required to collect a sufficient quantity of brine shrimp eggs from the shoreline utilizing shoveling apparatus and prior art netting devices. Furthermore, a substantial amount of debris is traditionally harvested with the collection of the brine shrimp eggs, thus requiring the addition of numerous filtering and cleaning stages or steps before the brine shrimp eggs are properly processed and prepared for drying, packaging, and storage.

In an attempt to improve the collection output of harvesting brine shrimp eggs using prior art shoreline harvesting methods and devices, several attempts were made by those skilled in the art to develop a way of concentrating the brine shrimp eggs into a smaller, designated area along the shoreline by means of utilizing extensive fencing structures extending substantially outward from the shoreline. These prior art fencing structures were found to be generally expensive and, in addition, the harvesting of the brine shrimp eggs usually required ready access to a substantial amount of shoreline in order to properly position the prior art fencing structures. Even with extensive fencing structures operatively disposed along the shorelines of a body of water, the productivity of prior art shoreline harvesting apparatus and methods for collecting brine shrimp eggs inevitably remained at the uncontrollable mercy of the wind, the weather, and the water currents.

In view of the foregoing disadvantages of prior art shoreline harvesting techniques and methods, those skilled in the art began to integrate the teachings and disclosures of prior art oil-skimming devices and techniques. Consequently, oil-skimming devices of the prior art provided an immediate resource of technology in relation to the techniques and methods developed for removing oil from a body of water by means of incorporating an apparatus for skimming the surface of the water. Prior art oil-skimming apparatus and methods were found to be intimately analogous to the needs realized by those skilled in the art for harvesting brine shrimp eggs from a relative body of water.

For example, prior art oil-skimming devices may comprise one or more of the following structural and/or functional elements: (1) a means for funneling or directing an accumulation of oil floating at or near the surface of the water into a concentrating assembly; (2) a concentrating assembly comprising a substantially level, horizontal leading edge for skimming the surface of the water, wherein the leading edge may be connected to a mechanism for adjusting the positioning of the leading edge in relation to the surface of the water; (3) an inlet port disposed in operative relation to the concentrating assembly; and (4) a suction pump for pumping the oil and materials collected at the inlet port into a distillation tank or container providing a means for settling the oil from the water as a result of the specific gravity of the oil in relation to the water. Inherently similar in structural design and function, those skilled in the art developed apparatus and methods for use in harvesting brine shrimp eggs which customarily incorporate one or more of the elements of prior art oil-skimming devices, as outlined above.

As a result of the physical characteristics and nature of brine shrimp eggs in relation to oil, those skilled in the art modified the oil skimming technology of the prior art by replacing its distillation tanks with porous container bags. In particular, the replacement of the distillation tanks with one or more porous container bags was generally meant to provide a means for allowing water to filter through the mesh material comprising the porous bags, thereby leaving the collection of live and dead brine shrimp, brine shrimp eggs, discarded brine shrimp shell casings, brine fly casings, wood pieces, trash, tumbleweeds, twigs, dead waterfowl, and/or other types of floating debris within the porous storage bags for transport to an off-water site for processing, cleaning, drying, packaging, and storage.

Although the assimilation of prior art oil-skimming technology for harvesting bring shrimp eggs from a body of water overcomes some of the disadvantages of the prior art shoreline harvesting methods, such brine shrimp egg skimming devices of the prior art still embody several inherent disadvantages and limitations. For example, utilizing a collection assembly supportably disposed in relation to a buoyant frame or watercraft including a structural leading edge for skimming the surface of the water at a general depth of less than 5 cm (2 inches), and more particularly, at a depth of 0.625 cm to 2.5 cm (¼ inch to 1 inch) below the surface of the water, normally requires the buoyant frame to move through the various streams of naturally occurring brine shrimp egg colonies and other floating debris in order to adequately skim the mixture from the surface of the water and deposit the mixture into one or more prior art porous container bags. A meaningful drawback to navigating through these naturally occurring colonies of brine shrimp eggs and floating debris which may cover a significant area of the surface of the body of water generally involves serious inconveniences and an inefficient use of time in relation to overall productivity. In this regard, it typically takes a significant amount of time to sufficiently skim off all the brine shrimp eggs found in a naturally occurring egg streak.

Besides prior art skimming devices for harvesting brine shrimp eggs, other apparatus and methods were developed by those skilled in the art. For example, prior art egg harvesters were developed consisting of a scooping mechanism utilized for removing the free-floating mixture from the water and introducing the collected mixture of live and dead brine shrimp, brine shrimp eggs, discarded shell casings, brine fly casings, pieces of wood, trash, tumbleweeds, twigs, dead waterfowl, and/or other types of floating debris into one or more porous container bags. Traditionally, prior art scooping devices may employ a series of collection members or baskets that are generally capable of being immersed below the surface of the water by means of a rotational conveyor system in order to scoop the mixture from the water.

Prior art scooping devices for harvesting brine shrimp eggs, however, have been found to incorporate several disadvantages. For example, depending on the rotational direction of a supporting conveyor system, the movement of prior art scooping devices through the water typically generate a stirring motion in the water which may encourage the brine shrimp eggs deeper under the surface of the water, thereby making the potential harvest much less efficient and productive. In addition, by means of utilizing a water-permeable collection basket, the water generally drains through the mesh screen comprising the basket and, unfortunately, the brine shrimp eggs have been found to aggregate and adhere to the mesh walls of the collection basket thereby making it difficult to adequately remove all the brine shrimp eggs before the collection basket re-enters the water by way of the rotating conveyor system. Prior art scooping devices for harvesting brine shrimp eggs also customarily incorporate multiple working parts which may facilitate a complicated system of operation and/or method of use. As appreciated in this particular art, economic considerations carry significant weight when dealing with the highly competitive brine shrimping industry, since relatively complicated apparatus and methods are frequently found to be expensive and, likewise, commercially impractical.

In operation, brine shrimp egg harvesting apparatus and methods of the prior art customarily remove a naturally occurring mixture of brine shrimp eggs and debris floating at or near the surface of a body of water and deliver this collected mixture into a storage assembly or one or more container bags preferably formed having a porous construction. Similarly, porous container bags of the prior art may provide a means for water to disperse from the mixture, thereby leaving the collected brine shrimp eggs and debris contained within one or more of the porous bags. A significant amount of unwanted debris remains within the porous container bags intimately intermixed with the brine shrimp eggs. As noted above, the floating debris may include, but is not intended to be limited to, dead and live brine shrimp, discarded brine shrimp shell casings, brine fly casings, pieces of wood, trash, tumbleweeds, twigs, dead waterfowl, and/or other types of floating material. The collected debris, together with the brine shrimp eggs, generally comprise the mixture floating on or at the surface of the water. Historically, prior art porous container bags are filled with this mixture and preferably transported to shore where the collected brine shrimp eggs may be separated from the unwanted debris at a processing plant utilizing a means of removing the unwanted debris and retaining the "clean" brine shrimp eggs for purposes of drying, packaging, and storage.

An inherent disadvantage with collection methods of prior art harvesting apparatus is that one or more sites are required to process and clean the brine shrimp eggs from the unwanted debris for purposes of drying, packaging, and storage before the quality of the egg begins to degrade and spoil. Another serious disadvantage with prior art collection apparatus and methods is that the greater the quantity of the debris collected and retained within the porous container bags, the less the overall quantity of brine shrimp eggs retained contiguously with the unwanted debris within the container bags as a result of the limited internal holding capacity of each bag.

Similarly, the buoyant support frame or watercraft which supports prior art harvesting apparatus may have to unload often due to the inclusion of unwanted debris. Consequently, a substantial amount of time and labor may be required to take one or more boats to shore in order to unload the container bags filled with this mixture of brine shrimp eggs and other floating debris. Multiple trips to shore for off-loading may therefore have a major effect on the overall productivity and economic output of the harvesting operation. Accordingly, the time allocated for actual harvesting of brine shrimp eggs may be adversely affected, if a considerable amount of time is spent traveling to and from the shore for unloading. If prior art brine shrimp egg harvesting equipment is tied up by way of unloading, competitors will, more often than not, have the opportunity to stake valuable claims to the remaining colonies of brine shrimp eggs available on the open water for harvesting.

Efforts have continuously been made in an attempt to more efficiently harvest brine shrimp eggs and remedy many of the above-identified disadvantages. The prior art brine shrimp egg harvesting apparatus and methods discussed herein leave much to be desired from the standpoint of manufacturing costs, simplicity of construction, and effectiveness of operation. Considering all these factors, prior art apparatus and methods for harvesting brine shrimp eggs have also proven to require a significant investment of time and labor in relation to the overall goal of producing a supply of "clean" brine shrimp eggs for subsequent processing, storage, and sale. None of the prior art disclosures suggest or teach the present inventive system or combination of elements for an apparatus and method for harvesting and cleaning brine shrimp eggs on the open water, as herein described and claimed.

BRIEF SUMMARY AND OBJECTS OF THE INVENTION

In view of the foregoing, it is a primary object of the present invention to provide novel apparatus and methods for harvesting and cleaning brine shrimp eggs on the open water.

It is also an object of the present invention to provide apparatus and methods for harvesting and cleaning brine shrimp eggs which comprise a concentration member for surrounding a mixture of naturally occurring brine shrimp eggs and debris floating at or near the surface of a body of water and concentrating this mixture into a concentrated egg-debris mud mixture having a general thickness and compact density of about 7.5 cm to 45 cm (3 inches to 18 inches).

Further, it is an object of the present invention to provide apparatus and methods for harvesting and cleaning brine shrimp eggs which provide a means for separating and removing unwanted debris from a concentrated mixture, whereby "clean" brine shrimp eggs are deposited into one or more porous container bags on a buoyant support frame (e.g., watercraft) while on the open water.

It is a still further object of the present invention to provide apparatus and methods for harvesting and cleaning brine shrimp eggs which comprise a novel containment boom apparatus utilized for encircling, retaining and concentrating one or more floating colonies of brine shrimp eggs and debris into a concentrated egg/debris mud mixture for harvesting, rather than maneuvering a watercraft through a body of water to skim naturally occurring colonies of brine shrimp eggs and debris floating at or near the surface of the water.

In addition, it is an object of the present invention to provide apparatus and methods for harvesting and cleaning brine shrimp eggs which are capable of providing an efficient mode of operation with regards to the time and labor expended by way of: (1) forming a concentrated egg/debris mud mixture so not to waste time skimming and (2) separating the brine shrimp eggs from the unwanted debris of the concentrated egg-debris mud mixture so as to minimize the number of trips to the shore to unload, thus increasing overall productivity.

Moreover, it is an object of the present invention to provide apparatus and methods for harvesting and cleaning brine shrimp eggs which simplifies the harvesting process.

Consistent with the foregoing objects, and in accordance with the invention as embodied and broadly described herein, an apparatus for harvesting and cleaning brine shrimp eggs is disclosed in one preferred embodiment of the present invention as comprising a buoyant support frame (e.g., watercraft) having a collection assembly operably disposed in relation thereto. In preferred operation, a concentration member provides a means for surrounding a mixture of naturally occurring brine shrimp eggs and debris floating at or near the surface of a body of water and concentrating the naturally occurring mixture into a concentrated egg/debris mud mixture having a general thickness of about 7.5 cm to 45 cm (3 inches to 18 inches). As it is retracted, the concentration member facilitates the introduction of the concentrated egg/debris mud mixture of brine shrimp eggs and debris into the collection assembly.

Engageably disposed in relation to the collection assembly, a first extraction apparatus provides a means for transporting the concentrated egg/debris mud mixture introduced within the collection assembly to a filtering/cleaning assembly preferably disposed on board the buoyant support frame. Preferably, the filtering/cleaning assembly separates the brine shrimp eggs from the concentrated egg/debris mud mixture by means of a filtering system, thus providing "clean" brine shrimp eggs. These "clean" brine shrimp eggs may be correspondingly delivered and deposited into one or more porous container bags by means of a delivery system being operatively disposed between the filtering/cleaning assembly and the porous container bags.

One presently preferred method of the present invention for harvesting and cleaning brine shrimp eggs may comprise the following steps of: (1) concentrating a mixture of naturally occurring brine shrimp eggs and debris floating at or near the surface of a body of water into a concentrated egg/debris mud mixture; (2) introducing the concentrated egg/debris mud mixture into a collection assembly; (3) transporting the collected egg/debris mud mixture to a filtering/cleaning assembly; (4) separating the brine shrimp eggs from the unwanted debris of the concentrated egg/mud mixture; and (5) delivering the separated "clean" brine shrimp eggs to at least one porous container bag. The additional step of dewatering the separated brine shrimp eggs before delivery to one or more porous container bags may be further incorporated.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only exemplary embodiments of the invention and are, therefore, not to be considered limiting of its scope, the invention will be described with additional specificity and detail through use of the accompanying drawings in which:

FIG. 1 is a perspective view of an apparatus for harvesting and cleaning brine shrimp eggs in accordance with one presently preferred embodiment of the present invention;

FIG. 2 is a cross-sectional view illustrating one presently preferred embodiment of a concentrating member of one presently preferred embodiment of the apparatus for harvesting and cleaning brine shrimp eggs of the present invention;

DETAILED DESCRIPTION OF THE PREFERRED EMBODIMENTS

Figure 3:
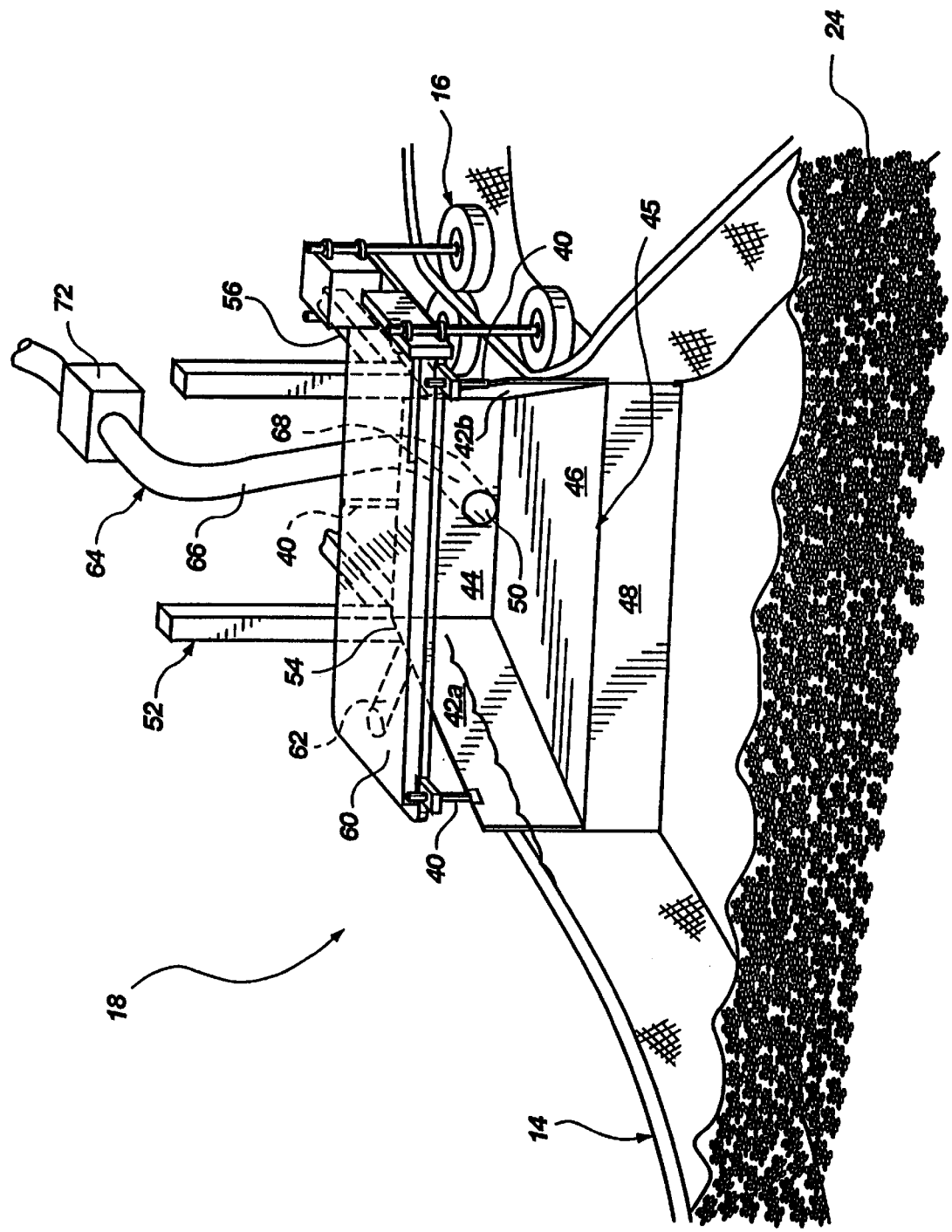
FIG. 3 is a perspective view of one presently preferred embodiment of a collection assembly of one presently preferred embodiment of the apparatus for harvesting and cleaning brine shrimp eggs of the present invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 13, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

One presently preferred embodiment of the present invention, designated generally at 10, is best illustrated in FIG. 1. As shown, an apparatus for harvesting and cleaning brine shrimp eggs 10 preferably comprise a buoyant support frame 12 having a collection assembly 18 and concentration member 14 operably disposed in supportable relation thereto for collecting a mixture 15 of naturally occurring brine shrimp eggs and debris floating at or near the surface of the water and concentrating the mixture 15 into a concentrated egg/debris mud mixture 24 having a general thickness of about 7.5 cm to 45 cm (3 inches to 18 inches). Engageably disposed in relation to the collection assembly 18, a first extraction apparatus 64 provides a means for transporting the concentrated egg/debris mud mixture 24 introduced within the collection assembly 18 to a filtering/cleaning assembly 20. In operation, the filtering/cleaning assembly 20 separates the brine shrimp eggs from the unwanted debris of the concentrated egg/debris mud mixture 24 by means of at least one cleaning screen 82, thereby providing "clean" brine shrimp eggs. The "clean" brine shrimp eggs may be correspondingly delivered to at least one porous container bag 144 by means of a delivery system 22 operably disposed between the filtering/cleaning assembly 20 and one or more porous container bags 144.

The concentration member 14 provides a means for concentrating the mixture 15 of naturally occurring brine shrimp eggs and debris into a concentrated egg/debris mud mixture 24 having a general thickness of about 7.5 cm to 45 cm (3 inches to 18 inches). The concentration member 14 further provides a means for influencing the introduction of the concentrated egg/debris mud mixture 24 into the collection assembly 18. Referring to FIGS. 2 and 3, the concentration member 14 comprises a flexible containment boom apparatus engaging a boom retrieval member 16. The boom retrieval member 16 preferably provides a manual or automated means which facilitates the retrieval of the concentration member 14 from an extended position on a body of water.

In structural relationship, the boom retrieval member 16 is preferably mounted to the platform 60 and its supporting structure. As best illustrated in FIG. 3, the boom retrieval member 16 preferably includes a retrieval of the concentration member 14 from an extended position on a body of water.

In structural relationship, the boom retrieval member 16 is preferably mounted to the collection assembly 18. As best illustrated in FIG. 3, the boom retrieval member 16 is preferably mounted to the collection assembly 18. As best illustrated in FIG. 3, the boom retrieval member 16 preferably includes a retrieval assembly comprising a guide wheel, an engagement wheel, a driving wheel, an axle for each wheel, a support member for each axle, and a hydraulic, mechanical, or electromechanical driving means. In preferred operation, the boom retrieval member 16 provides a means for retaining a portion of the body of the concentration member 14 substantially flush with the front end of the collection assembly 18 to facilitate a means for introducing the concentrated egg/debris mud mixture 24 into the collection assembly 18. It will be readily appreciated to those skilled in the art that other modifications and adaptations for concentrating the mixture 15 of naturally occurring brine shrimp eggs and debris floating at or near the surface of a body of water are possible which are consistent with the spirit and scope of the present invention.

Referring back to FIG. 2, in one presently preferred embodiment of the present invention, the concentration member 14 may comprise a buoyant crown 30, a porous skirt 32, a reeling line 34, and sufficient weighted members 36 disposed in relation to the porous skirt 32 to provide a weighted means for retaining the porous skirt 32 below the surface of the water. Preferably, the crown 30 may be formed of a sufficiently buoyant material to provide a means for sustaining the concentration member 14 from sinking, especially in relation to the disposition of the weighted members 36. As will be readily appreciated by those skilled in the art, any suitable buoyant material and/or variation in the structural design of the concentration member 14 are anticipated by the present invention. For example, the buoyant crown 30 may comprise one or more Styrofoam® pieces preferably housed within a solid covering that provides sufficient structural integrity and support to retain the dimensional shape of the buoyant crown 30. Similarly, those skilled in the art will readily recognize other possible modifications and adaptations of the concentration member 14 which are consistent with the spirit and scope of the present invention.

The length of the concentration member 14 may vary from a few hundred feet to a thousand feet or more, depending upon the size needed to surround one or more colonies of naturally occurring brine shrimp eggs and debris floating at or near the surface of a body of water. Correspondingly, the vertical length of the porous skirt 32 of one presently preferred embodiment of the concentration member 14 may be disposed below the surface of the water from a few inches to several feet. In one presently preferred embodiment of the present invention, the vertical length of the porous skirt 32 preferably extends about 15 cm to 210 cm (6 inches to 84 inches) below the surface of the water, and preferably about 150 cm (60 inches). As can be appreciated, the relative dimensions of the concentration member 14 and the porous skirt 32 can, of course, vary dependent upon the proportional size of the material or substances being harvested from the water.

As further illustrated in FIG. 2, attached to the buoyant crown 30 opposite the connection of the reeling line 34 is the porous skirt 32. The porous skirt 32 preferably comprises a material having a vertically disposed, dimensional length sufficient for being disposed below the surface of the water. In the novel construction of one presently preferred embodiment of the present invention, the porous skirt 32 may preferably be formed of a water-permeable material which is inherently impermeable to the passage of brine shrimp eggs and/or other larger debris. Preferably, the porous skirt 32 may comprise a mesh size of approximately 140 microns to 150 microns or less. Since the mesh size of the porous skirt 32 of the present invention should generally be slightly less than the dimensional size of the material or substance being concentrated, it is anticipated that the mesh size may be varied in order to accommodate different collection uses.

In operation, the water-permeability of the porous skirt 32 preferably provides a means for reducing the amount of water collected by the concentration member 14. Thus, the characteristics of the porous skirt 32 facilitate a means for easily passing the skirt through the water in which it floats, while retaining the mixture 15 of naturally occurring brine shrimp eggs and other larger debris and forming a concentrated egg/debris mud mixture 24 disposed within the boundaries of the concentration member 14.

It will be apparent that other conventional means of concentrating a floating substance or mixture of naturally occurring brine shrimp eggs and debris may be incorporated by the present invention while maintaining the inventive principles as set forth herein. For example, an alternate preferred embodiment of the concentration member 14 may comprise a collection boom apparatus having a solid skirt 32 disposed in relation to a buoyant crown 30 and may be utilized for concentrating the mixture 15 into a concentrated egg/debris mud mixture 24 for introduction into the collection assembly 18.

As shown in FIG. 1, the collection assembly 18 may be supportably disposed in relation to the buoyant support frame 12. In structural design, the buoyant support frame 12 preferably supports the collection assembly 18 for placement into and subsequent removal from a body of water. As illustrated in one presently preferred embodiment of the apparatus for harvesting and cleaning brine shrimp eggs 10, the buoyant support frame 12 preferably comprises a water craft. Alternatively, the buoyant support frame 12 may be structurally independent of a watercraft, while providing a separate buoyant means sufficient for supporting the collection assembly 18 in relation thereto when floating in a body of water.

Referring now to FIG. 3, the collection assembly 18 may be formed comprising at least two opposing sidewalls 42a, 42b disposed in spaced-apart relationship and being substantially parallel to each other, a back wall 44, and an L-shaped panel 45 having a first member 46 and a second member or lip 48. In structural relationship, the second member 48 preferably extends substantially perpendicular to the disposition of the first member 46. As illustrated, the two opposing side walls 42a, 42b, the back wall 44, and the L-shaped panel 45 are contiguously disposed in relation to each other, thus forming a collection pan assembly having an open end opposite the back wall 44. The open end opposite the back wall 44 provides an opening which facilitates the introduction of the concentrated egg/debris mud mixture 24 within the internal periphery of the collection assembly 18, as defined by its structural components.

In preferred construction, the two opposing side walls 42a, 42b, the back wall 44, and the L-shaped panel 45 of the collection assembly 18 are formed of a sufficiently rigid, solid material. For example, the structural components of the collection assembly 18 may be comprised of a suitable metal or metal alloy having the general qualities and characteristics of being significantly immutable to deterioration which can be caused as a result of the continuous immersion in a hypersaline environment, as to which the present invention is preferable operated. It will be readily appreciated by those skilled in the art, however, that other suitable materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

In structural relationship to the buoyant support frame 12, the collection assembly 18 may be supported by one or more support members 40 engaging a platform 60 as best illustrated in FIG. 3. As will be readily appreciated, the disposition of the collection assembly 18 in relation to the platform 60 may include a removable or fixed supportable engagement there-between. Providing a means for sustaining one or more persons and/or other objects, the platform 60 may be supportably disposed adjacent the collection assembly 18 by means of one or more platform support braces 62. Further, the collection assembly 18 and the platform 60 may be adjustably disposed in relation to the surface of the water by means of incorporating a conventional lift assembly 52.

In one presently preferred embodiment of the present invention, the lift assembly 52 consists of one or more lift supports 56 rigidly attached to the buoyant support frame 12 (e.g., watercraft) and operatively disposed in such a manner so as to provide a means for horizontally supporting the platform 60 and the collection assembly 18 attached thereto. Preferably, the lift assembly 52 is disposed at an end substantially opposite the driving or propulsion system of the buoyant support frame 12. The lift assembly 52 may be supported by at least one structural coupling 54 which engages the platform 60, to which the collector assembly 18 may be fixed or removably attached, to provide a means for vertically adjusting the platform 60 and the collection assembly 18 in relation to the buoyant support frame 12 and the surface of the body of water.

In operation, the lift assembly 52 preferably comprises a conventional hydraulic system which includes a means for vertically adjusting the collection assembly 18 and the platform 60 in relation to the water. As shown in FIGS. 1 and 3, the control assembly 58 for the lift assembly 52 may be positioned approximate the front end of the buoyant support frame 12 to provide an operator with a means for adjusting the height of the collection assembly while maintaining the ability to visualize the harvesting process. As will be appreciated by those skilled in the art, any suitable hydraulic, manual mechanism, or electromechanical device may be utilized in relation to the lift assembly 52 of the present invention, thus providing a means for selectively raising and/or lowering the collection assembly 18 in relation to the water.

As will be readily acknowledged by those skilled in the art, the platform 60 is not essential to the functionality of the present invention. Accordingly, one or more persons and/or objects may be disposed in other appropriate positions or locations, such as, for example, on board the buoyant support frame 12, without detracting from the general benefits and advantages of the presently preferred embodiments of the apparatus for harvesting and cleaning brine shrimp eggs 10 of the present invention. If such an alternate embodiment was implemented, in that the collection assembly 18 is not disposed in supportable relation to the platform 60, the collection assembly 18 may be directly disposed in an adjustable relationship to the lift assembly 52 which preferably provides a means for facilitating the vertical adjustment of the collection assembly 18 in relation to the water.

Figure 4:
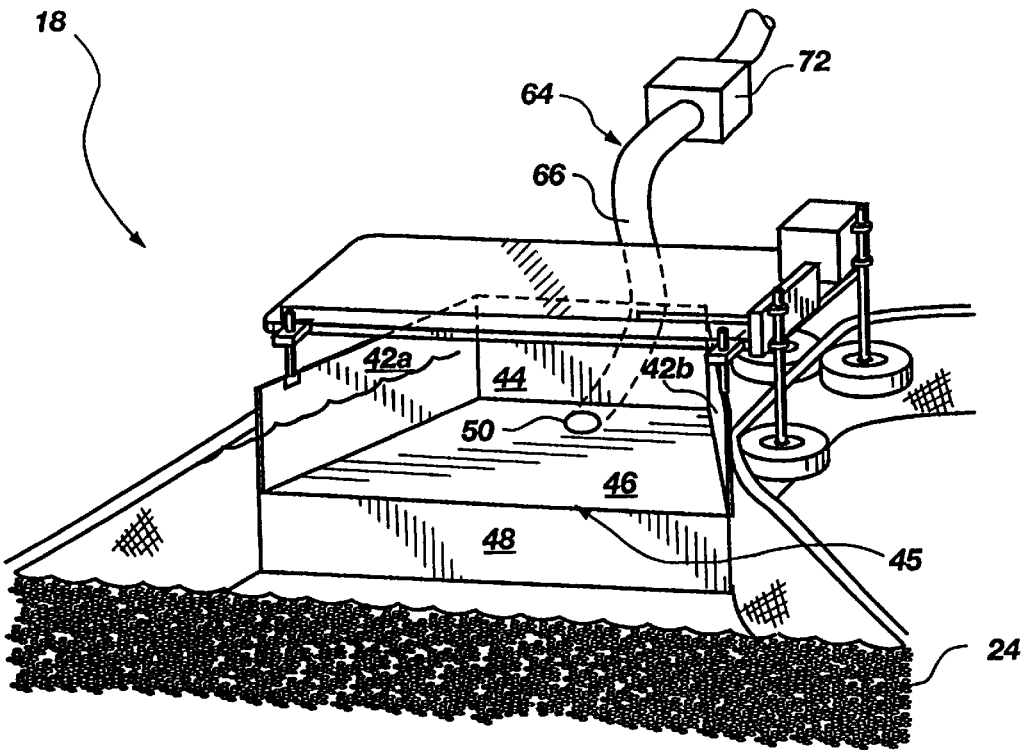
FIG. 4 is a perspective view of another presently preferred embodiment of a collection assembly of one presently preferred embodiment of the apparatus for harvesting and cleaning brine shrimp eggs of the present invention.
Figure 5:
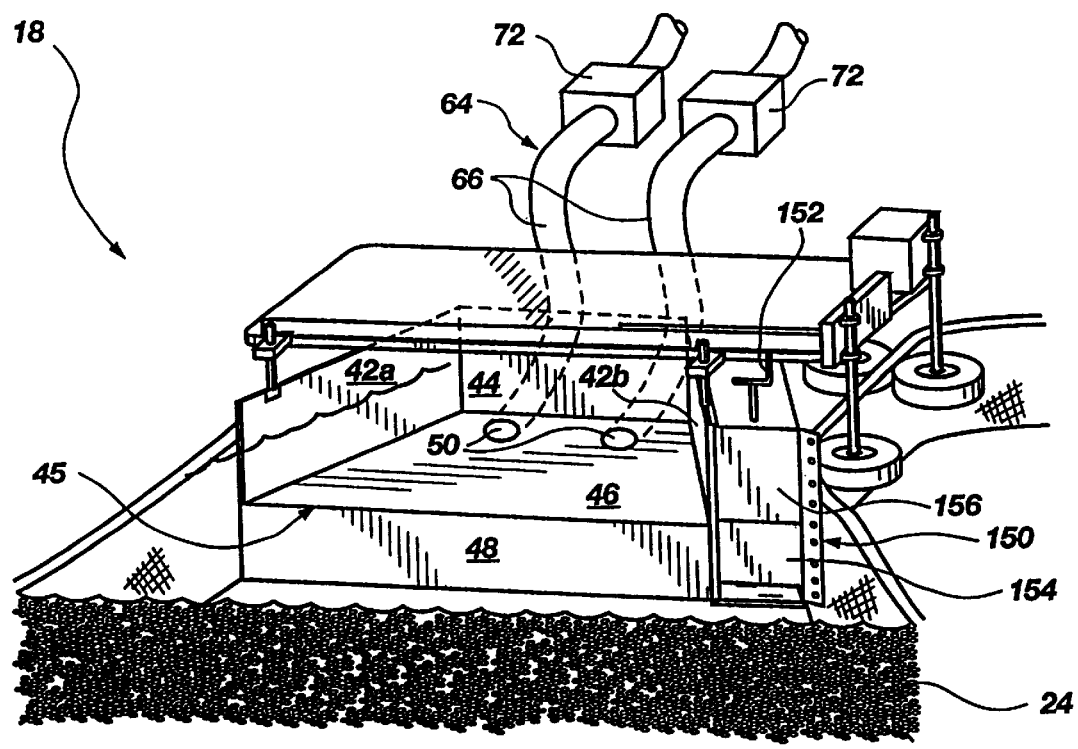
FIG. 5 is a perspective view of yet another presently preferred embodiment of a collection assembly of one presently preferred embodiment of the apparatus for harvesting and cleaning brine shrimp eggs of the present invention, illustrating one presently preferred embodiment of a by-pass flow mechanism.

As discussed above, the second member or lip 48 of the L-shaped panel 45 of the collection assembly 18 is preferably formed of a substantially solid, rigid material. In one presently preferred embodiment of the apparatus for harvesting and cleaning brine shrimp eggs 10 of the present invention, the second member or lip 48 is disposed in a substantially perpendicular relationship to the first member 46, as best illustrated in FIGS. 3, 4 and 5. In preferred operation, the second member 48 of the L-shaped panel 45 may be disposed below the surface of the water by means of the lift assembly 52 such that, in combination with the dimensional length of the porous skirt 32 of one presently preferred embodiment of the concentration member 14, a dimensional boundary may be established for surrounding the concentrated egg/debris mud mixture 24 of brine shrimp eggs and debris.

In operation, the first member 46 of the L-shaped panel 45 is disposed just below the concentrated egg/debris mud mixture 24. In this regard, the first member 46 of the L-shaped panel 45 is preferably disposed below the surface of the water at a general depth of about 7.5 to 45 cm (3 inches to 18 inches), thereby being consistent with the general thickness of the concentrated egg/debris mud mixture 24. similarly, on the average, the first member 46 of the L-shaped panel 45 is preferably disposed below the surface of the water at a general depth of about 15 cm to 20 cm (6 inches to 8 inches), thus corresponding to the average thickness of the concentrated egg/debris mud mixture 24 before being introduced into the collection assembly 18.

As realized in accordance with one presently preferred embodiment of the present invention, the dimensional boundary as defined by the porous skirt 32 of the concentration member 14 and the second member 48 of the L-shaped panel 45 of the collection assembly 18 may not be wholly uniform in that the porous skirt 32 is preferably water-permeable, while the second member 48 is preferably formed having a substantially impermeable, solid construction being substantially equivalent to the structure of the side walls 42 and the back wall 44. In this regard, the impermeability of the second member 48 of the L-shaped panel 45 significantly restricts the passage of the concentrated egg/debris mud mixture 24, thus providing a means for restricting the concentrated egg/debris mud mixture 24 from readily passing beneath the buoyant support frame 12 (e.g., watercraft), as best shown in FIG. 1.

Consistent with the foregoing, when the concentrated egg/debris mud mixture 24 approaches a thickness and compact density of about 30 cm to 45 cm (12 inches to 18 inches) or more, it may sometimes be difficult to position the first member 46 of the L-shaped panel 45 completely under the concentrated egg/debris mud mixture. In such instance, the second member or lip 48 of the L-shaped panel 45 serves to corral the concentrated egg/debris mud mixture 24 for subsequent collection by the collection assembly 18 so that a portion of the concentrated egg/debris mud mixture 24 is not lost under the buoyant support frame 12 (e.g., watercraft).

As can be appreciated, the presently preferred embodiment of the collection assembly 18 of the apparatus for harvesting and cleaning brine shrimp eggs 10 of the present invention cannot be functionally utilized as a form of skimming device, as a result of the disposition of the second member 48 of the L-shaped panel 45 of the collection assembly 18. In particular, the substantially perpendicular disposition of the second member 48 of the L-shaped panel 45 in relation to the first member 46 would frustrate the functionality of a skimming device by creating torrents of water that would dissipate the mixture 15 of naturally occurring brine shrimp eggs and debris further beneath the surface of the water, thereby encouraging the mixture out of a collectable range for effectuating a productive harvest.

As can be further appreciated, the apparatus for harvesting and cleaning brine shrimp eggs 10 of the present invention may incorporate various alternate means for collecting and concentrating a mixture of naturally occurring brine shrimp eggs and debris and introducing the concentrated egg/debris mud mixture into a collection assembly for delivery to the filtering/cleaning assembly 20 for the separation of the brine shrimp eggs from the egg/debris mud mixture. It is intended, therefore, that the preferred embodiments of the collection assembly 18 as provided herein be viewed as exemplary of the collection principles of the present invention, and not as necessarily restrictive to a particular structure for implementing those principles.

In one presently preferred embodiment of the collection assembly 18 of the present invention, an opening 50 may be integrally formed in the back wall 44, as illustrated in FIG. 3. The opening 50 is preferably formed having an internal periphery sufficient for allowing the concentrated egg/debris mud mixture 24 to pass therethrough. In preferred operational design of the present invention, at least one opening 50 is formed in the back wall 44 of the collection assembly 18 and may be relatively disposed below the surface of the water.

Referring to FIG. 4, an opening 50 may be integrally formed in the first member 46 of the L-shaped panel 45 of an another presently preferred embodiment of the collection assembly 18. The opening 50 formed in the first member 46 preferably comprises an internal periphery being sufficient for allowing the concentrated egg/debris mud mixture 24 to pass there-through. In this presently preferred embodiment, at least one opening 50 is formed in the first member 46 of the collection assembly 18. In this regard, it will be readily appreciated by those skilled in the art, that more than one opening 50 may be disposed in the first member 46 of the collection assembly 18. In this regard, it will be readily appreciated by those skilled in the art, that more than one opening 50 may be disposed in the first member 46 of the L-shaped panel 45. For example, the collection assembly 18 of an alternate preferred embodiment of the present invention may comprise two openings 50 disposed in the first member 46 of the L-shaped panel, as shown in FIG. 5. Consistent with the foregoing, it is contemplated by the present invention that one or more openings may be formed in the back wall 44, the first member 46 of the L-shaped panel 45, and/or in either or both of the side walls 42a, 42b.

Referring to FIGS. 3, 4 and 5, the opening or openings 50 formed in relation to the collection assembly 18 are designed to provide fluid communication with a first extraction apparatus 64 engageably disposed in connection therewith. Functionally, the opening or openings 50 formed in the collection assembly 18 provide a means for focusing the concentrated egg/debris mud mixture 24 into a first end 68 of an extraction tube 66 of a first extraction apparatus 64, whereby the concentrated egg/debris mud mixture 24 may be pumped from the collection assembly 18 to a filtering/cleaning assembly 20. It will be appreciated by those skilled in the art that since the dimensional size and shape of the opening or openings 50 formed in the collection assembly 18 will vary according to the dimensional size and shape of the material or substances being collected, it is anticipated that different shapes and sizes of the openings 50 are possible such that to accommodate the passage of various materials or substances.

In yet another presently preferred embodiment of the present invention as illustrated in FIG. 5, the apparatus for harvesting and cleaning brine shrimp eggs 10 may incorporate a bypass flow mechanism 150 engageably disposed in relation to the collection assembly 18. In preferred structure, the bypass flow mechanism 150 may comprise a stationary member 156, an openable gate 154, and a flow adjustment member 152 that provides a means for adjusting the openable gate 154 in relation to the fixed member 156 to allow a portion of the concentrated egg/debris mud mixture 24 to flow through the open passageway formed as a result thereof, thereby reducing the concentration of the live and dead brine shrimp which can be generally found below the level of buoyant brine shrimp eggs. In addition, the openable gate 154 may be adjusted in such a manner so as to release fresh water. As shown, the stationary member 156 is preferably formed having a dimensional height which substantially corresponds to the dimensional height of the adjoining side wall 42. Similarly, the openable gate 154 of the bypass flow mechanism 150 is preferably formed having a dimensional height that substantially corresponds to the dimensional height of the adjoining second member 48 of the L-shaped panel 45.

In preferred construction, the bypass flow mechanism 150 is formed of a sufficiently rigid, solid material. For example, the structural components of the bypass flow mechanism 150 may be comprised of a suitable metal or metal alloy having the general qualities and characteristics of being significantly immutable to deterioration which can be caused as a result of the continuous immersion in a hyper-saline environment, as to which the present invention is preferably operated. It will be readily appreciated by those skilled in the art, however, that other suitable materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

In operation, the openable gate 154 may be disposed in a first position by means of the flow adjustment member 152 thereby allowing a portion of the concentrated egg/debris mud mixture 24 to flow therethrough. Moreover, the openable gate 154 may be disposed in a second position by means of the flow adjustment member 152. In the second position, the openable gate 154 acts as an extension of the second member 48 of the L-shaped panel 45, thus providing a means for restricting the passage of the concentrated egg/debris mud mixture 24 beneath the buoyant support frame (e.g., watercraft). As can be appreciated, those skilled in the art will readily recognize other possible modifications and adaptations for regulating a bypass flow of the concentrated egg/debris mud mixture 24 which are consistent with the spirit and scope of the present invention.

Figure 8:
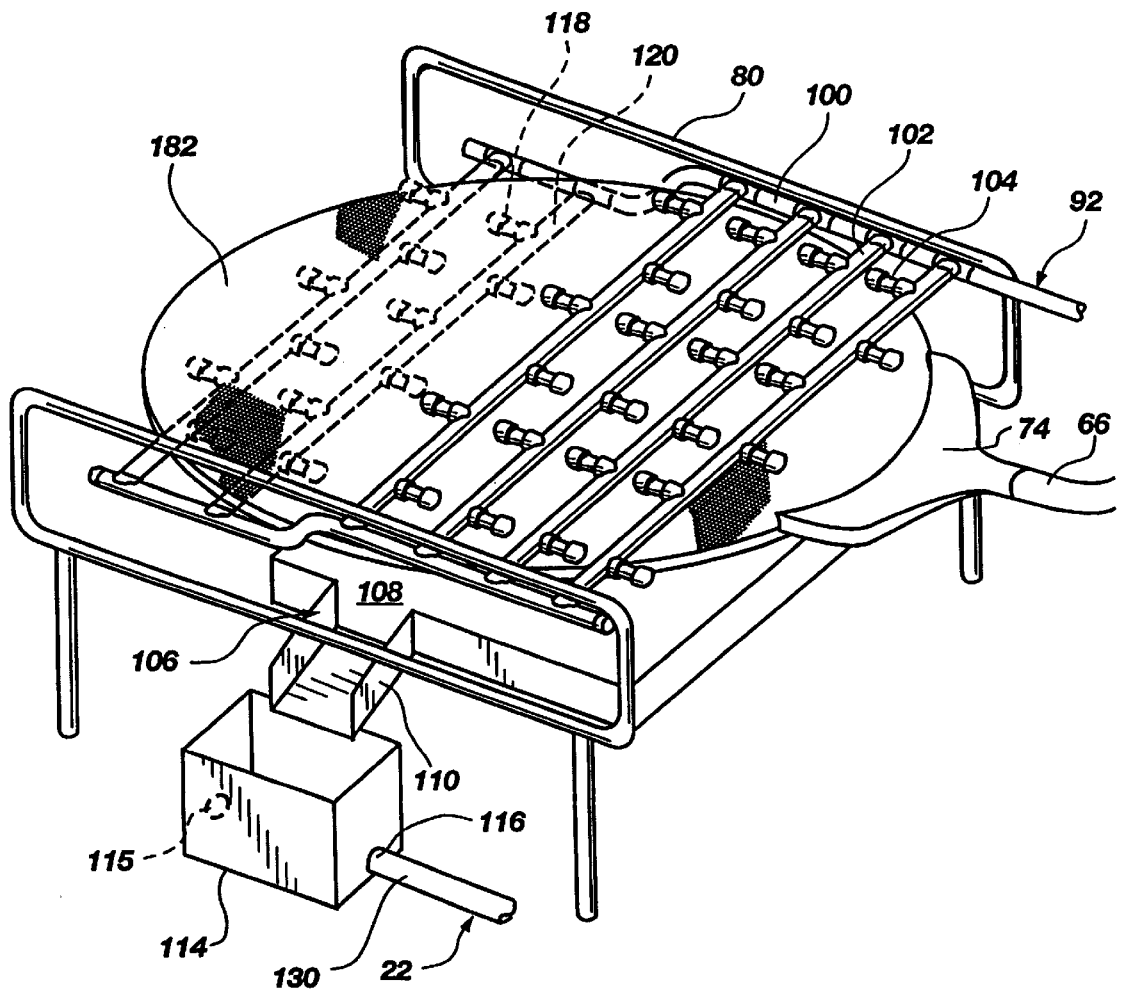
FIG. 8 is a perspective view of another presently preferred embodiment of the cleaning screen of one presently preferred embodiment of the filtering/cleaning assembly of one presently preferred embodiment of the apparatus for harvesting and cleaning brine shrimp eggs of the present invention.

As noted above, the first extraction apparatus 64 comprises an extraction tube 66 and a collection pump 72. the extraction tube 66 includes a first end 68, a second opposing end 70, and an intermediate portion disposed therebetween. Preferably, the extraction tube 66 is engageably disposed between the opening 50 formed in the collection assembly 18 and the filtering/cleaning assembly 20. In operation, the collection pump 72 provides a delivery means having sufficient capacity for transporting the concentrated egg/debris mud mixture 24 from the collection assembly 18 to the filtering/cleaning assembly 20 by way of the extraction tube 66, as best illustrated in FIGS. 1, 3, 4, and 5. In addition, as evidenced for example by referring to FIG. 6, the second end 70 of the extraction tube 66 preferably engages a delivery guide 74 disposed in relation to the first end 76 of the filtering/cleaning assembly 20. In preferred operation, the delivery guide 74 provides a means for dispensing the concentrated egg/debris mud mixture 24 substantially across the dimensional width of a cleaning screen 82 of the filtering/cleaning assembly 20, as best depicted in FIGS. 6 and 8.

In preferred structure, the delivery guide 74 may be formed having an elongated, substantially conical shape for dispersing the concentrated egg/debris mud mixture 24 across its distal end. Further, the delivery guide 74 includes a mounting member for engaging the filtering/cleaning assembly 20 and a delivery port for engaging the second end 70 of the extraction tube 66 thus providing fluid communication therebetween, as shown in FIGS. 6 and 7. In an alternate preferred embodiment, the delivery guide 74 may comprise a substantially elongated, flat surface area having a plurality of internal spacers formed therein for dispersing the concentrated egg/debris mud mixture 24 across its distal end. It will be readily appreciated, however, that other shapes and/or configurations of the delivery guide 74 are possible.

In one presently preferred embodiment of the present invention, the delivery guide 74 may be formed of a sufficiently sturdy material. For example, the delivery guide 74 may be formed of a suitable metal or metal alloy having the general qualities and characteristics of being significantly immutable to deterioration which can be caused as a result of continuous immersion in a hypersaline environment, as to which the present invention is preferably operated. It will be readily appreciated by those skilled in the art, however, that other suitable materials, such as, wood fiberglass, graphite, ceramic, any of the numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, formed, or laminated, or any other suitable composite materials are readily possible which are consistent with the spirit and scope of the present invention.

Figure 6:
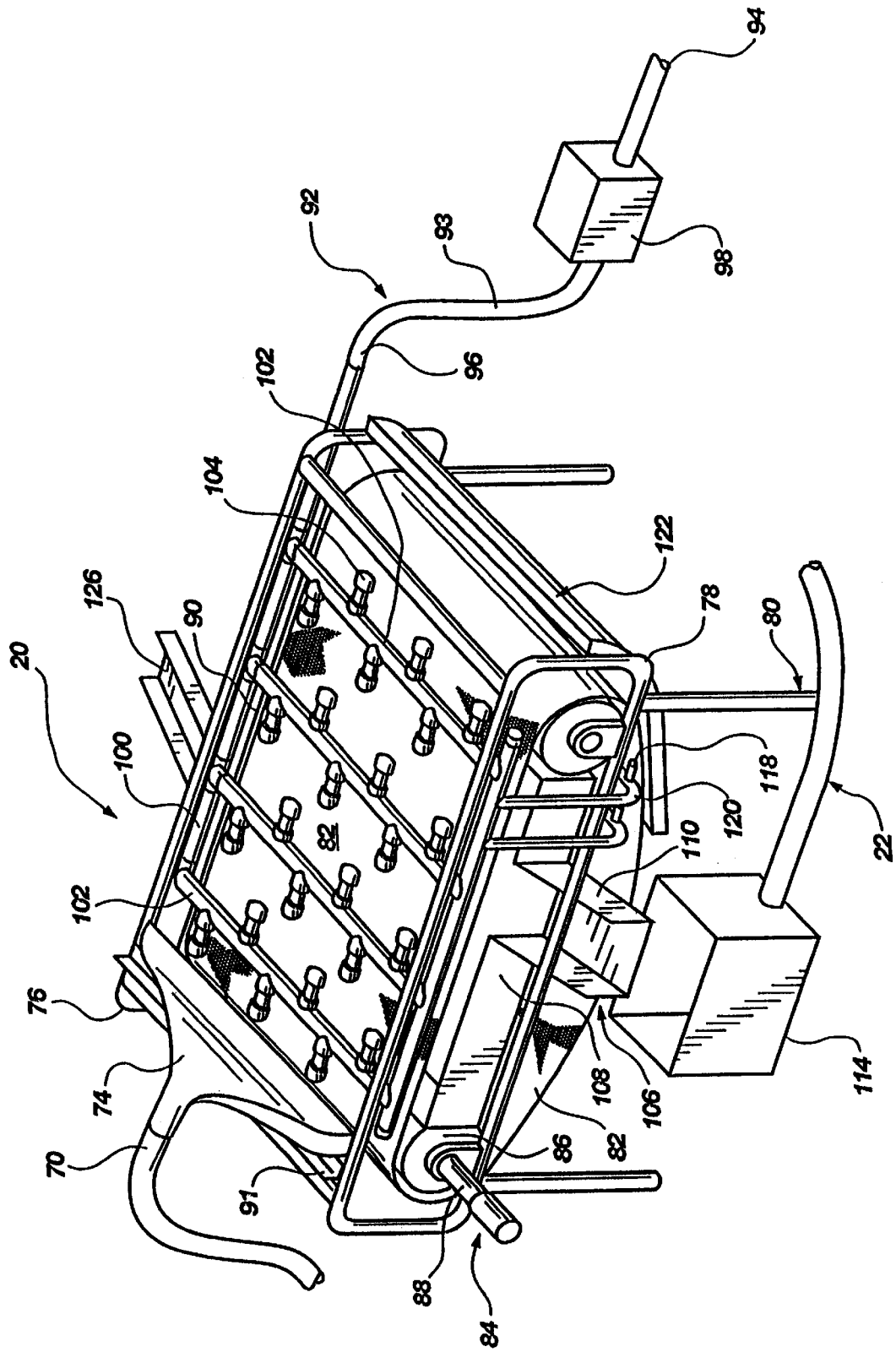
FIG. 6 is a perspective view showing a presently preferred embodiment of a filtering/cleaning assembly of one presently preferred embodiment of the apparatus for harvesting and cleaning brine shrimp eggs of the present invention.
Figure 7:
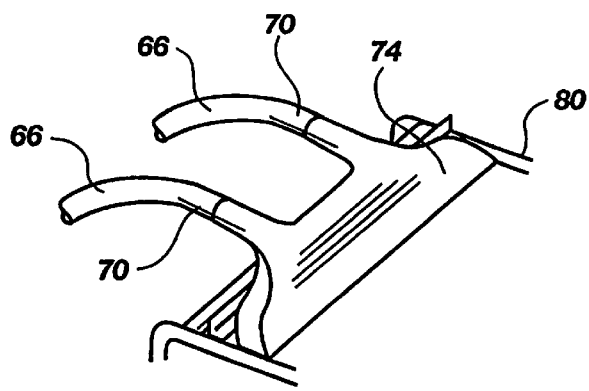
FIG. 7 is a perspective view illustrating an alternate preferred embodiment of the delivery guide of one presently preferred embodiment of the apparatus for harvesting and cleaning brine shrimp eggs of the present invention.

Referring now to FIGS. 1 and 6, the filtering/cleaning assembly 20 may be positioned on board the buoyant support frame 12 (e.g., watercraft) or in relation to some other supportable surface. As shown, the filtering/cleaning assembly 20 is preferably disposed in supportable relation to a stationary or moveable support frame 80. The support frame 80 generally provides a means for structurally supporting the various components of the filtering/cleaning assembly 20. In one presently preferred embodiment, the support frame 80 is positioned adjacent the end of the buoyant support frame 12 which supportably engages the collection assembly 18.

In preferred construction, the support frame 80 may be formed having a conventional frame structure preferably comprised of a rigid metal or other suitable material capable of supporting the components of the filtering/cleaning assembly 20. For example, the support frame 80 may be formed of a suitable metal or metal alloy having the general qualities and characteristics of being significantly immutable to deterioration which can be caused as a result of a hyper-saline environment, as to which the present invention is preferably operated. It will be readily appreciated by those skilled in the art, however, that other suitable rigid materials, such as, wood, fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn, foamed, or laminated, or any other suitable composite materials are readily possible which are consistent with the spirit and scope of the present invention.

As best illustrated in FIG. 6, at least one water feeding conduit 100 is longitudinally disposed in mountable relation to the support frame 80. Preferably, one or more water feeding conduits 100 may be disposed substantially parallel to each other and longitudinally arranged on opposing sides of the support frame 80. Preferably, the water feeding conduits 100 comprise a substantially hollow channel having an internal periphery sufficient for introducing a flow of water therethrough. Engageably disposed in fluid communication with at least one water feeding conduit 100 is at least one feeding pipe 102. Similar in construction, one or more feeding pipes 102 are preferably disposed in fluid communication with the water feeding conduits 100 and formed having a substantially hollow channel defining an internal periphery sufficient for introducing a flow of water therethrough.

In one presently preferred embodiment of the present invention, the feeding pipes 102 may be engageably disposed substantially perpendicular to the water feeding conduits 100 and, accordingly, arranged dimensionally transverse the support frame 80. In current design, a plurality of feeding pipes 102 are disposed in fluid communication with one or more water feeding conduits 100. Moreover, a plurality of spray nozzles 104 may be mountably disposed in fluid communication with the feeding pipes 102 to provide a means for delivering a pressurized flow of water to an egg-permeable cleaning screen 82 of the filtering/cleaning assembly 20. The feeding pipes 102 preferably incorporate a flow control valve (not shown) whereby the flow of water delivered by the water feeding conduit 100 to the feeding pipes 102 can be selectively adjusted to provide a means for regulating the pressurized water delivered to the spray nozzles 104.

In preferred construction, the water feeding conduits 100 and the feeding pipes 102 are formed having a generally cylindrical configuration, thus providing an internal diameter sufficient for transporting a sufficient amount of water therethrough. It will be readily appreciated by those skilled in the art, however, that other shapes and/or configurations of the feeding conduits 100 and the feeding pipes 102 are possible which are consistent with the spirit and scope of the present invention.

The spray nozzles 104 may consist of one or more conventional nozzle heads preferably mounted in spaced-apart relation along the longitudinal length of the feeding pipes 102 and generally comprise the capability of being directionally disposed, if desired. As shown in FIG. 6, the spray nozzles 104 of one presently preferred embodiment of the present invention are preferably disposed in relation to the feeding pipes 102 so as to provide a directional spray which generally alternates in directional output by means of being operably directed towards opposing sides of the feeding pipes 102. Moreover, the angular direction of the spray nozzles 104 may be arranged in such a manner so that the directional spray dispensing therefrom may be directed towards the egg-permeable cleaning screen 82 so as to angularly optimize a directional stream of pressurized water whereby facilitating a washing effect or forced rolling of the passing live or dead brine shrimp or larger debris of the concentrated egg/debris mud mixture 24 to further encourage the separation of the brine shrimp eggs from the mixture.

Similarly, the directional spray of the nozzles 104 of the present invention may be configured to provide a means for spraying towards and against the movement of the cleaning screen 82 to encourage the separation of the brine shrimp eggs from the collected mud mixture 24. As will be appreciated, the spray nozzles 104 disposed along the feeding pipe 102 at a first end 76 of the filtering/cleaning apparatus 20 may be disposed in such a manner so as to provide a more narrowed, stream-lined directional spray at the distal end of the delivery guide 74 to assist in diluting the concentrated egg/debris mud mixture 24 with water. Consistent with the foregoing, other modifications in relation to the directional spray of the nozzle heads 104 are contemplated herein which are consistent with the spirit and scope of the present invention.

In preferred operation, a second extraction apparatus 92 provides a means for introducing a pressurized flow of water into one or more feeding conduits 100, wherein the water may be directed into one or more feeding pipes 102 disposed in fluid communication therewith and further delivered to an egg-permeable cleaning screen 82 by means of a plurality of spray nozzles 104 operably disposed in fluid communication with the feeding pipes 102, as discussed above. In one presently preferred embodiment of the present invention, the second extraction apparatus 92 comprises an extraction tube 93 having a first end 94, a second opposing end 96, and an intermediate portion disposed therebetween. Preferably, the second extraction apparatus 92 further includes a suction pump 98 operatively disposed in relation to the extraction tube 93.

In one preferred embodiment, the first end 94 of the extraction tube 93 is preferably disposed below the surface of the body of water in which the buoyant support frame 12 (e.g., watercraft) is floating. As best shown in FIG. 6, the second end 96 of the extraction tube 93 of the extraction apparatus 92 may be removably attached to the water feeding conduit 100 thus providing a pressurized flow of water therethrough. Correspondingly, the second end 96 of the extraction tube 93 may provide a fixed or removable attachment in relation to a first end of the water feeding conduit 100 such that the second end 96 of the extraction tube 93 does not become readily detached therefrom under the force of the water pressure generated by the suction pump 98. As will be readily appreciated by those skilled in the art, the components of the second extraction apparatus 92 may be correspondingly similar to or seemingly identical to the working components comprising the first extraction apparatus 64.

In operation, the suction pump 98 comprises a delivery means having the capacity for pumping a meaningful supply of water through the extraction tube 93 and into the water feeding conduit 100 mountably disposed in relation to the support frame 80 of the filtering/cleaning assembly 20. In this manner, the water extracted by the suction pump 98 and directed to the water feeding conduit 100 may be further pumped with sufficient pressure to the feeding pipes 102 and delivered to the egg-permeable cleaning screen 82 by means of the plurality of directional spray nozzles 104 operably disposed in fluid communication with the feeding pipes 102. The spray nozzles 104 preferably provide a spray of water having a pressurized output which is sufficient for influencing the brine shrimp eggs through the egg-permeable cleaning screen 82 and into an assembly for collecting clean egg 106, thus separating the brine shrimp eggs from the collected mud mixture 24.

Consistent with the foregoing, the water feeding conduits 100, the feeding pipes 102, and the spray nozzles 104 are preferably constructed of a suitable metal or metal alloy having the general qualities and characteristics of being significantly immutable to deterioration which can be caused as a result of a hypersaline environment, as to which the present invention is preferably operated. It will be readily appreciated by those skilled in the art, however, that other suitable materials, such as, wood fiberglass, graphite, ceramic, any of numerous organic, synthetic, or processed materials that are mostly thermoplastic or thermosetting polymers of high molecular weight with or without additives, such as, plasticizers, auto oxidants, colorants, or fillers, which can be shaped, molded, cast extruded, drawn foamed, or laminated, or any other suitable composite materials are readily possible which are consistent with the spirit and scope of the present invention. For example, conventional PVC piping may be used for the feeding pipes 102 and the water feeding conduits 100.

Various configurations of the water conduit and piping structures, as well as the nozzle orientations as anticipated herein, may be incorporated to achieve the desired results of influencing the brine shrimp eggs through the egg-permeable cleaning screen 82. For example, in an alternate embodiment, a first water feeding conduit may be operatively connected in fluid communication to a second water feeding conduit by means of a fluid connecting member disposed in fluid communication therebetween (not shown), thus providing a flow of water from the second extraction apparatus 92 to the first water feeding conduit 100 which may operatively direct a portion of the water flow to the second water feeding conduit. It is intended, therefore, that the examples provided herein be viewed as exemplary of the principles of the present invention, and not as restrictive to a particular structure or configuration for implementing those principles.

In one presently preferred embodiment of the present invention, the cleaning screen 82 is preferably formed of a porous material which is inherently permeable to the passage of brine shrimp eggs and impermeable to the passage of any larger debris. Preferably, the egg-permeable cleaning screen 82 of the present invention comprises a screen size of approximately 350 microns. However, since the micron size of the cleaning screen 82 of the present invention should generally correspond to the dimensional size of the material or substance being harvested and cleaned, it is anticipated that the different structural elements of the cleaning screen 82 may be formed in various sizes in order to accommodate different harvesting and cleaning uses.

Figure 10:
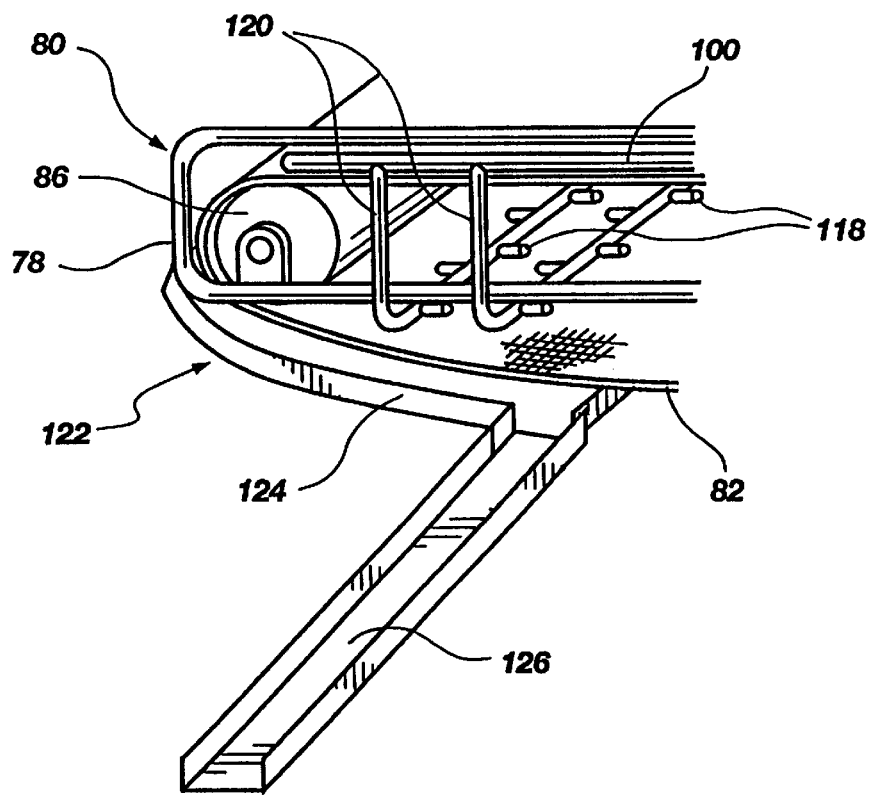
FIG. 10 is a perspective view showing one presently preferred embodiment of an assembly for disposing of unwanted debris from the concentrated egg/debris mud mixture of one presently preferred embodiment of the apparatus for harvesting and cleaning brine shrimp eggs of the present invention.

In operation, the permeability of the cleaning screen 82 preferably provides a means for filtering the brine shrimp eggs from the concentrated egg/debris mud mixture 24 collected by the collection assembly 18 and delivered to the filtering/cleaning assembly 20 by the first extraction apparatus 64. In particular, the structural characteristics of the cleaning screen 82 preferably facilitate a means for passing the brine shrimp eggs through the cleaning screen 82 and into an egg collection assembly 106, while readily retaining the remaining mud mixture 24 comprising the unwanted debris for elimination by means of a disposal assembly 122, as best shown in FIGS. 6 and 10.

Structurally, the cleaning screen 82 comprises an egg-permeable screen preferably disposed over the outer surface of a conventional endless belt frame. In one presently preferred embodiment, the cleaning screen 82 may be engageably disposed in rotatable relation to a conventional conveyor system 84, as shown in FIG. 6. The conveyor system 84 preferably comprises at least two rollers 86 disposed in relation to one or more support shafts 88 mountably engaging the support frame 80. Further, the conveyor system 84 is preferably coupled to a power source

*not shown) which generally provides a means for rotatably driving at least one roller 86 and, correspondingly, the cleaning screen 82 engageably disposed in rotatable relation with the rollers 86.

In one presently preferred embodiment of the present invention, the rollers 86 of the conveyor system 84 may be mounted adjacent opposing ends of the support frame 80. Consistent with this arrangement, the cleaning screen 82 may comprise an endless construction mountably disposed in rotatable relation to the rollers 86 of the conveyor system 84 and preferably retained sufficiently taut therebetween. It can be appreciated that those skilled in the art will readily recognize other possible modifications, adaptations or mechanisms which may be constructed in accordance with the inventive principles set forth herein.

For example, an alternate preferred embodiment of the cleaning screen 182 may be formed having a substantially circular configuration, as illustrated in FIG. 8. In operation, the cleaning screen 182 may be disposed in relation to a means for horizontally rotating the cleaning screen in a single plane. Corresponding, the concentrated egg/debris mud mixture 24 collected in the collection assembly 18 may be delivered to the cleaning screen 182 by means of at least one extraction apparatus 64 disposed in fluid communication between the collection assembly 18 and the delivery guide 74 of the filtering/cleaning assembly 20.

Upon delivery, the concentrated egg/debris mud mixture 24 may be dispersed across the distal end of the delivery guide 74 to dispense the concentrated egg/debris mud mixture 24 substantially across the dimensional width of a cleaning screen 182, as discussed above. Consistent with the inventive principles of the present invention as previously outlined, a plurality of feeding pipes 102 are disposed in fluid communication with one or more water feeding conduits 100. Moreover, a plurality of spray nozzles 104 may be mountably disposed in fluid communication with the feeding pipes 102 to provide a means for delivering a pressurized flow of water to the egg-permeable cleaning screen 182 for separating the brine shrimp eggs from the collected egg/debris mud mixture 24.

As further illustrated, one or more screen-cleaning feeding pipes 120 having a plurality of spray nozzles 118 may be disposed in fluid communication with at least one water feeding conduit 100 for delivering a highly pressurized flow of water form beneath the moving cleaning screen 182, thereby providing a backwash system for removing the remaining debris of the mud mixture 24 from the cleaning screen 182. As can be appreciated, the remaining debris of the separated mud mixture 24 needs to be substantially removed from the cleaning screen 182 before the newly extracted concentrated egg/debris mud mixture 24 is delivered to the moving cleaning screen 182 by the first extraction apparatus 64.

In alternate preferred embodiments of the apparatus for harvesting and cleaning brine shrimp eggs of the present invention, one or more moving cleaning screens may be incorporated in addition to the presently preferred embodiment of the egg-permeable cleaning screen 82, whereby providing additional means for filtering and separating the brine shrimp eggs from the concentrated egg/debris mud mixture 24 collected by the collection assembly 18. As will be readily appreciated by those skilled in the art, various cleaning screen arrangements are possible which are consistent with the spirit and scope of the present invention. It is intended, therefore, that the examples provided herein be viewed as exemplary of the principles of the present invention, and not as restrictive to a particular structure or structures for implementing those principles.

As illustrated in FIG. 6, in preferred construction, the filtering/cleaning assembly 20 may comprise one or more retention guards 90, 91 which provide a means for preventing the collected mud mixture 24 delivered to the filtering/cleaning assembly 20 by the first extraction apparatus 64 from running off the sides of the cleaning screen 82, 182. The retention guards 90 are preferably disposed along the opposing longitudinal sides of the support frame 80 and generally extend substantially the length thereof to provide a barrier being flush with the upper surface of the cleaning screen 82, 182 which restricts an overflow of the concentrated egg/debris mud mixture 24 from over the sides of the cleaning screen 82, 182. In addition, a retention guard 91 may be disposed at the first end 76 of the support frame 80 and operably arranged so as to be dimensionally transverse the retention guards 90 disposed in relation to the longitudinal sides of the support frame 80, thus providing a barrier being flush with the upper surface of the cleaning screen 82, 182 to restrict an overflow of the collected mud mixture 24 at the front end of the cleaning screen 82, 182.

The retention guards 90, 91 are preferably formed of a sufficiently sturdy, resilient material having a solid construction and being capable of withstanding shock without permanent deformation. For example, the retention guards 90, 91 of one presently preferred embodiment of the present invention are formed of a natural or synthetic rubber. It will be readily appreciated by those skilled in the art, however, that other suitable resilient materials, such as, for example, closed cell polyurethane, styrene-butadiene thermo-plastic elastomers, chloroprene elastomers, polycarbonate elastomers and the like are possible.

As discussed above, a plurality of spray nozzles 104 may be mountably disposed in fluid communication with the feeding pipes 102 to provide a means for delivering a directional pressurized flow of water to the cleaning screen 82, 182 of the filtering/cleaning assembly 20. In doing so, the disposition of the spray nozzles 104 preferably provide a spray of water having a pressurized output sufficient for influencing the brine shrimp eggs through the egg-permeable cleaning screen 82, 182 and into an egg collection assembly 106, thus separating the brine shrimp eggs from the collected mud mixture 24.

As illustrated in FIGS. 6 and 8, the egg collection assembly 106 for collecting clean brine shrimp eggs preferably comprises four side walls and a bottom panel contiguously disposed in relation therewith to provide a collection pan 108. Preferably, the egg collection pan 108 for collecting clean brine shrimp eggs may be supportably disposed in fixed relation to the support frame 80 of the filtering/cleaning assembly 20. In one presently preferred embodiment, the egg collection pan 108 may be disposed substantially intermediate the dimensional surface area of the upper portion and the lower portion of the endless, rotating cleaning screen 82, as best shown in FIG. 6. Correspondingly, the egg collection pan 108 may be substantially disposed the linear length of the cleaning screen 82. In an alternate embodiment of the present invention as illustrated in FIG. 8, the egg collection pan 108 may be disposed substantially beneath a portion of the dimensional surface area of the cleaning screen 182. The disposition of the egg collection pan 108 substantially corresponds to the egg collection pan 108 substantially corresponds to the disposition of the feeding pipes 102 and spray nozzles 104 which provide a means for influencing the brine shrimp eggs through the egg-permeable cleaning screen 182.

In preferred configuration, the four side walls and the bottom panel of the egg collection pan 108 provide a means for collecting brine shrimp eggs and water within its internal periphery and for diverting the collected brine shrimp eggs and water mixture into a feeding channel 110 for delivery into a receptacle 114. Consistent with the foregoing, the bottom panel of the egg collection pan 108 may be formed having a slightly slanted interior surface such that the collected brine shrimp eggs and water mixture generally travel, by means of gravity, to an outlet feeding channel 110 attached thereto. In operation, the feeding channel 110 is preferably formed in relation to the egg collection pan 108 to provide a means for delivering the separated brine shrimp egg and water mixture to the receptacle 114 without any disruption or loss of clean brine shrimp eggs.

Figure 9:
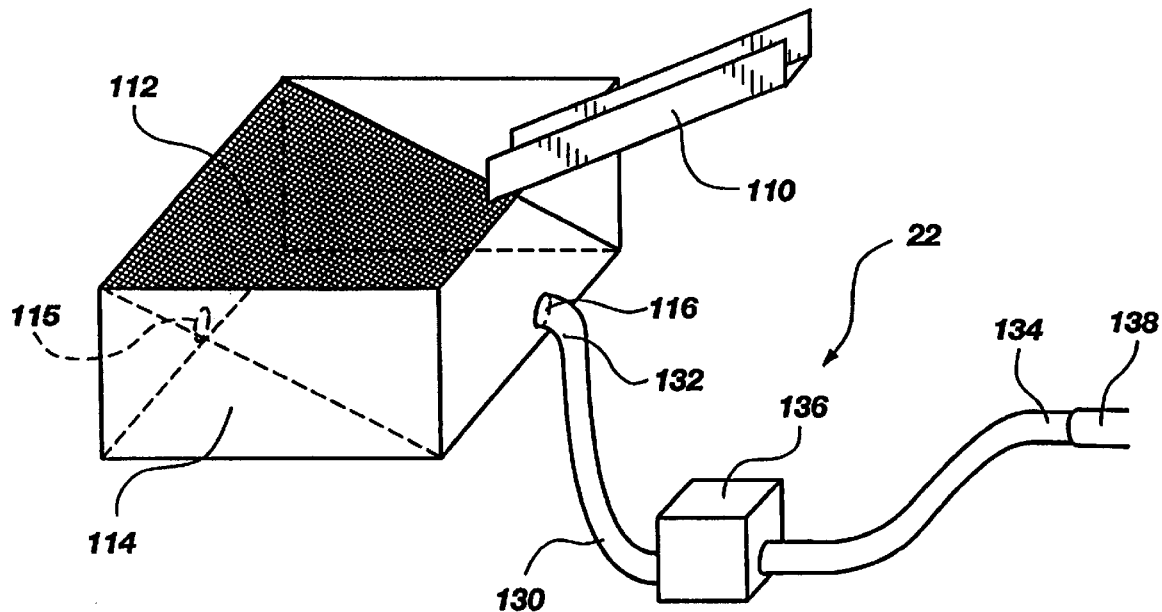
FIG. 9 is an exploded perspective view illustrating one presently preferred embodiment of an assembly for collecting "clean" brine shrimp eggs of one presently preferred embodiment of the apparatus for harvesting and cleaning brine shrimp eggs of the present invention.

As best illustrated in FIG. 9, a dewatering screen 112 may be angularly disposed within the internal periphery of the receptacle 114 to provide a means for removing excess water from the brine shrimp egg and water mixture, if desired. In the construction of one presently preferred embodiment of the present invention, the dewatering screen 112 is preferably comprised of a porous material being substantially impermeable to brine shrimp eggs and/or other larger debris, but readily permeable to the passage of water. Preferably, the dewatering screen 112 may comprise a screen size of approximately 140 microns to 150 microns. Since the size of the dewatering screen 112 of the present invention should generally be smaller in dimensional size than the material or substances being harvested, it is anticipated that the dewatering screen 112 may be formed in a series of different sizes in order to accommodate different collection uses of various materials or substances. It will be further appreciated by those skilled in the art that the dewatering screen 112 may alternatively be disposed within the internal periphery of the egg collection pan and/or at any other suitable location being consistent with the inventive principles of the present invention.

Figure 11:
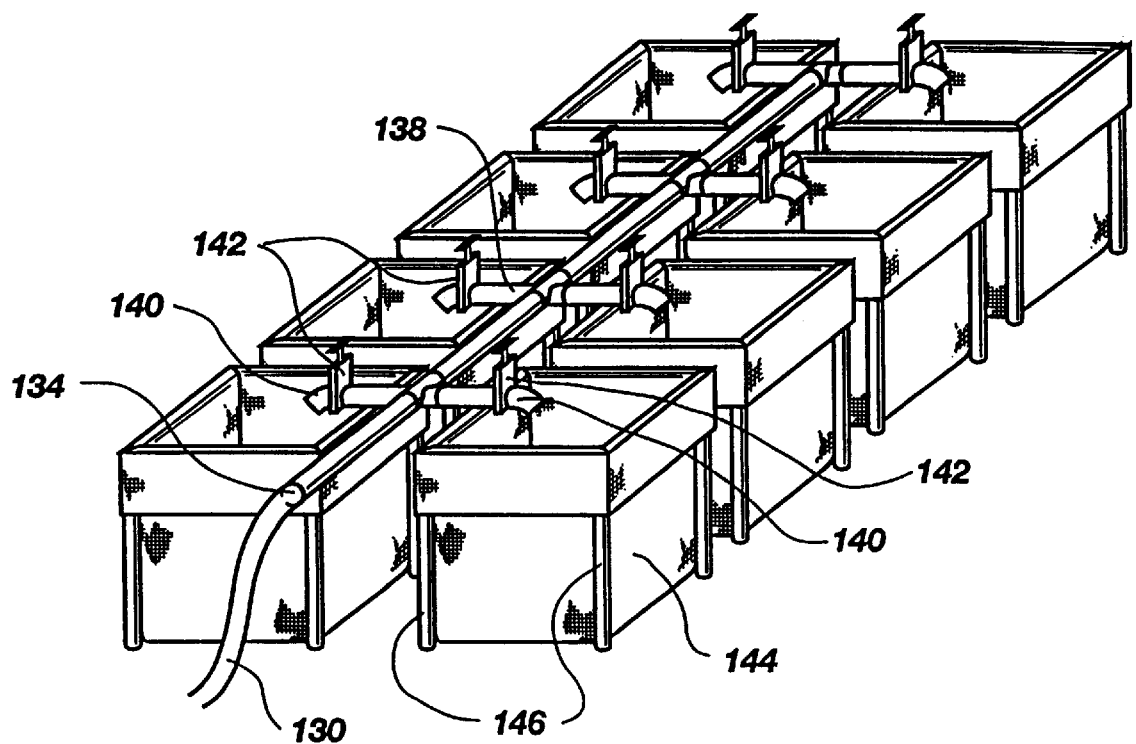
FIG. 11 is a perspective view of one presently preferred embodiment of an assembly for delivering "clean" brine shrimp eggs to one or more porous container bags of one presently preferred embodiment of the apparatus for harvesting and cleaning brine shrimp eggs of the present invention.

Preferably disposed in fluid communication with the receptacle 114, an assembly for delivering clean eggs 22 comprises a means for transporting the "clean" brine shrimp eggs collected within the receptacle 114 to at least one porous container bag 144 preferably disposed on the upper surface or deck of the buoyant support frame 12 (e.g., watercraft), as illustrated in FIGS. 1, 9 and 11. In one presently preferred embodiment of the present invention, at least one opening 116 may be integrally formed in one of the side panels of the receptacle 114, as shown in FIG. 9,. The opening 116 is preferably formed comprising an internal periphery which is sufficient for allowing the separated brine shrimp eggs and water mixture to readily pass therethrough.

In operation, the opening 116 is preferably disposed in one of the side panels of the receptacle 114 generally below the surface of the water. It will be readily appreciated by those skilled in the art, however, that one or more openings 116 may be alternatively disposed in any of the side walls, as long as the relative disposition of the opening or openings 116 are generally disposed below the surface of the water.

As further illustrated, the opening 116 formed in the receptacle 114 is designed to communicate with an assembly for delivering clean eggs 22 engageably disposed in connection therewith. Functionally, the opening 116 provides a means for focusing the brine shrimp eggs and water mixture into a first end 132 of a clean egg extraction tube 130 of the assembly for delivering clean eggs 22, whereby the "clean" brine shrimp eggs and water mixture may be removably pumped from the receptacle 114 to one or more porous container bags 144. It will be readily appreciated by those skilled in the art that since the dimensional size and shape of the opening 116 formed in the receptacle must generally correspond to the dimensional size and shape of the material or substances being collected, it is anticipated that different shapes and sizes of the opening 116 are possible to accommodate the passage of various material or substances.

Consistent with the foregoing, the assembly for delivering clean eggs 22 comprises a clean egg extraction tube 130 and a conventional delivery pump 136. The clean egg extraction tube 130 preferably includes a first end 132, a second opposing end 134, and an intermediate portion disposed therebetween. Preferably, the clean egg extraction tube 130 is engageably disposed between the opening 116 formed in the receptacle 114 and one or more porous container bags 144. In operation, the delivery pump 136 provides a conventional delivery means having sufficient capacity for transporting the brine shrimp eggs and water mixture from the receptacle 114 to one or more porous container bags 144 by way of the clean egg extraction tube 130, as best illustrated in FIGS. 9 and 11.

The second end 134 of the clean egg extraction tube 130 preferably engages a directional routing member 138. The routing member 138 preferably provides a means for selectively delivering the brine shrimp eggs and water mixture to a plurality of porous container bags 144, as best depicted in FIGS. 1 and 11. In one presently preferred embodiment of the present invention, the routing member 138 may be symmetrically bifurcated into a plurality of outlet ports 140 which comprise a conventional means for controlling the flow 142 from the outlet ports 140.

For example, one or more outlet ports 140 may be formed on one side of the routing member 138 and one or more outlet ports 140 may be disposed on the opposing side of the routing member 138. It will be apparent to those skilled in the art that other configurations may be utilized in accordance with the inventive principles set forth herein. For example, two or more routing members 138 may be used and, furthermore, any practical number of outlet ports 140 and/or porous container bags 144 are possible. It is intended therefore, that the examples provided herein be viewed as exemplary of the principles of the present invention, and not as restrictive to a particular structure for implementing those principles.

In current design, the porous container bags 144 are preferably formed of a material which is impermeable to brine shrimp eggs and readily permeable to water, thus allowing excess water to drain from the conventional porous bags while retaining the "clean" brine shrimp eggs therein. In a presently preferred configuration, one or more porous container bags 144 may be supported by a container support frame 146. Disposed in relation to the container support frame 146, the porous container bag 144 comprises a first end which may be retained in an openable position for introducing the brine shrimp eggs and water mixture therein. Correspondingly, the first end of the porous container bags 144 may be selectively arranged in a closed position to provide a means for restricting the discharge of the collected clean brine shrimp eggs.

Referring back to FIG. 9, at least one aperture 115 may be integrally formed in a side panel of the receptacle 114 preferably opposite the opening 116. The aperture 115 is preferably formed comprising an internal periphery which is sufficient for allowing water to readily pass therethrough, thus facilitating the dewatering of the brine shrimp eggs and water mixture within the receptacle 114.

The aperture 115 for dewatering the receptacle may be formed having any suitable geometrical configuration and disposed such that the internal periphery of the dewatering aperture 115 is formed at or neat the bottom of the side panel and being substantially contiguous the bottom panel of the receptacle 114. In particular, the disposition of the dewatering aperture 115 allows the extra water from the brine shrimp eggs and water mixture to pass therethrough, thus reducing the amount of water in the brine shrimp eggs and water mixture delivered to the porous container bags 144. In current design, the dewatering aperture 115 may comprise a conventional adjustment member thereby providing a means for adjusting the flow of water exiting from the receptacle 114. The excess water passing through the dewatering aperture 115 generally spills onto the deck of the buoyant support frame 12 (e.g., watercraft) and may subsequently flow overboard. In an alternate embodiment of the present invention, a tube, hose or the like may be connected to the dewatering aperture 115 to provide a means for directing the excess water directly over-board the buoyant support frame 12.

Referring now to FIGS. 6 and 10, engageably disposed in fluid communication with at least one water feeding conduit 100 is one or more screen-cleaning feeding pipes 120. The screen-cleaning feeding pipes 120 are preferably formed having a substantially hollow channel comprising an internal periphery sufficient for introducing a flow of water therethrough. In one presently preferred embodiment of the present invention, the screen-cleaning feeding pipes 120 may be engageably disposed substantially perpendicular to at least one water feeding conduit 100 and, accordingly, may be arranged dimensionally transverse the support frame 80.

In current design, a plurality of screen-cleaning feeding pipes 120 are preferably disposed in fluid communication with one or more water feeding conduits 100. Moreover, a plurality of spray nozzles 118 are mountably disposed in fluid communication with the screen-cleaning feeding pipes 120 to provide a means for delivering a highly pressurized spray of water to the cleaning screen 82 of the filtering/cleaning assembly 20. The screen-cleaning feeding pipes 120 preferably incorporate a flow control valve whereby the flow of water delivered by the water feeding conduit 100 to the feeding pipes 120 can be selectively adjusted to provide a means for regulating the pressurized water delivery to the nozzles 118.

In preferred construction, the screen-cleaning feeding pipes 120 are formed having a generally cylindrical configuration, thus providing an internal diameter sufficient for transporting a sufficient amount of water therethrough. It will be readily appreciated by those skilled in the art, however, that other shapes and/or configurations of the screen-cleaning feeding pipes 120 are possible which are consistent with the spirit and scope of the present invention. Additionally, the spray nozzles 118 may consist of one or more conventional nozzles preferably mounted in spaced-apart relation along the longitudinal length of the screen-cleaning feeding pipes 120 and comprise the capability of being directionally disposed, if desired.

In one presently preferred embodiment of the present invention as illustrated in FIG. 10, the nozzles 118 of the assembly for disposing unwanted debris 126 are preferably disposed in relation to the screen-cleaning feeding pipes 120 in such a manner so as to provide a directional spray which may generally alternate in directional output by means of being operably directed towards opposing sides of the screen-cleaning feeding pipes 120. In addition, the nozzles 118 may be arranged such that the directional spray dispensing therefrom may be directed substantially downward towards the backside of the cleaning screen 82.

In operation, the water delivered through the water feeding conduits 100 may be pumped to the screen-cleaning feeding pipes 120 and delivered against the backside of the cleaning screen 82 by means of a plurality of directional nozzles 118 disposed in fluid communication with the screen-cleaning feeding pipes 120. Correspondingly, the nozzles 118 preferably provide a dispensing spray of water having a pressurized output being sufficient for influencing the unwanted debris from the cleaning screen 82 by means of backwashing the screen 82, thus encouraging the removal of the unwanted debris of the collected mud mixture 24 from the rotating cleaning screen 82 and into a debris collection pan 124. As can be appreciated, different configurations of the piping structure and nozzle orientation as disclosed herein may be incorporated to achieve the desired results of removing the cleaning screen 82, 182 of any unwanted debris. It is intended, therefore, that the examples provided herein be viewed as exemplary of the principles of the present invention, and not as restrictive to a particular structure or configuration for implementing those principles.

Consistent with the foregoing, the screen-cleaning feeding pipes 120 and the nozzles 118 are preferably constructed of a suitable metal or metal alloy having the general qualities and characteristics of being significantly immutable to deterioration which can be caused as a result of a hypersaline environment, as to which the present invention is preferably operated. It will be readily appreciated by those skilled in the art, however, that other suitable materials, such as wood, fiberglass, graphite, ceramic, any of numerous organic, synthetic, or processed materials that are mostly thermoplastic or thermosetting polymers of high molecular weight with or without additives, such as plasticizers, auto oxidants, colorants, or fillers, which can be shaped, molded, cast extruded, drawn, foamed, or laminated, or any other suitable composite materials are readily possible which are consistent with the spirit and scope of the present invention. For example, conventional PVC piping may be used for the screen cleaning feeding pipes 120.

Referring still to FIG. 10, in one presently preferred embodiment of the present invention, the assembly for disposing of unwanted debris 126 preferably comprises four side walls and a bottom panel contiguously disposed in relation therewith to provide a debris collection pan 124. Preferably, the debris collection pan 124 is supportably disposed in fixed relation to the support frame 80 of the filtering/cleaning assembly 20. Similarly, the debris collection pan 124 may be preferably disposed beneath the lower portion of the endless, rotating egg-permeable cleaning screen 82. In particular, the debris collection pan 124 may be disposed substantially adjacent the second end 78 of the support frame 80 and preferably extends the corresponding width of the egg-permeable cleaning screen 82.

In preferred configuration, the four side walls and the bottom panel of the debris collection pan 124 provide a means for collecting the remaining debris of the concentrated egg/debris mud mixture 24 within its internal periphery and for diverting the debris into a debris feeding channel 126. Consistent with the foregoing, the bottom panel of the debris collection pan 124 may be formed having a slightly slanted interior surface such that the debris may travel, by means of gravity, to the debris feeding channel 126 attached thereto. Preferably, the debris feeding channel 126 is formed in relation to the debris collection pan 124 to provide a means for delivering the remaining debris over the side of the buoyant support frame 12 (e.g., watercraft). Although the present invention is illustrated and described in accordance with various examples provided herein in relation to the assembly for disposing unwanted debris, those skilled in the art will readily recognize other possible modifications and adaptations which are consistent with the spirit and scope of the present invention.

Although numerous techniques and methods are contemplated by the present invention, one presently preferred method for harvesting and cleaning brine shrimp eggs disposed in a mixture may comprise the steps of: (1) collecting the mixture of naturally occurring brine shrimp eggs and debris floating at or near the surface of a body of water and concentrating this mixture into a concentrated egg/debris mud mixture; (2) transporting the concentrated egg/debris mud mixture to a filtering assembly; (3) separating the brine shrimp eggs from the unwanted debris of the egg/debris mud mixture; and (4) delivering the separated brine shrimp eggs to at least one porous container. Importantly, the presently preferred method of harvesting and cleaning brine shrimp eggs of the present invention includes the step of concentrating the mixture of naturally occurring brine shrimp eggs and debris into a concentrated egg/debris mud mixture before introducing the egg/debris mixture into a collection assembly for subsequent delivery to a filtering/cleaning assembly for purposes of separating the brine shrimp eggs from the unwanted debris of the concentrated egg/debris mud mixture. This step of concentrating the mixture of naturally occurring brine shrimp eggs and debris results in a concentrated egg/debris mud mixture having a general thickness of about 7.5 cm to 45 cm (3 inches to 18 inches).

As will be readily appreciated by those skilled in the art, other possible modifications and adaptations to the presently preferred method for harvesting and cleaning brine shrimp eggs disposed in a mixture are possible which are consistent with the spirit and scope of the present invention. For example, an alternate preferred method may include the steps of: (1) obtaining an apparatus for harvesting and cleaning brine shrimp eggs 10 of the present invention, as disclosed herein; (2) manipulating a concentration member 14 around a mixture 15 of naturally occurring brine shrimp eggs and debris so as to provide a concentrated egg/debris mud mixture 24 having a general thickness of 7.5 cm to 45 cm (3 inches to 18 inches) before introducing the concentrated egg/debris mud mixture 24 into a collection assembly 18; (3) manually removing large debris from the concentrated egg/debris mud mixture 24 prior to collecting the concentrated egg/debris mud mixture 24 from the body of water; (4) transporting the collected egg/debris mud mixture 24 to a filtering/cleaning assembly 20; (5) separating the brine shrimp eggs from the concentrated egg/debris mud mixture 24 by means of an egg-permeable cleaning screen 82 and a pressurized water delivery system; and (6) delivering the separated "clean" brine shrimp eggs to at least one porous container 144.

The presently preferred method of harvesting and cleaning brine shrimp eggs of the present invention may further include the step of dispensing an angular directional spray dispensing from the nozzles 104 so as to angularly optimize a directional stream of pressurized water, thereby facilitating a washing effect or forced rolling of the passing live or dead brine shrimp or larger debris of the concentrated egg/debris mud mixture 24 to further encourage the separation of the brine shrimp eggs from the mud mixture. In addition, the presently preferred method for harvesting and cleaning brine shrimp eggs may include the step of discarding the unwanted debris of the collected mud mixture 24 by means of a disposal delivery system.

Consistent with the foregoing, a water-permeable skirt 32 may be incorporated into the structural design of the concentration member 14, if desired, to provide a means for reducing the amount of water collected within the confines of the containment member and, accordingly, to diminish the potential of generating a stirring motion in the water that may encourage the brine shrimp eggs deeper beneath the surface of the water, thereby making the potential harvest mush less efficient and productive. Similarly, a dewatering screen 112 may be incorporated into the preferred steps of the present invention for decreasing the amount of water in the clean brine shrimp egg and water mixture before delivery to one or more porous containers 144.

ALTERNATIVE PRESENTLY PREFERRED EMBODIMENTS OF THE COLLECTION ASSEMBLY OF THE PRESENT INVENTION

Figure 12:
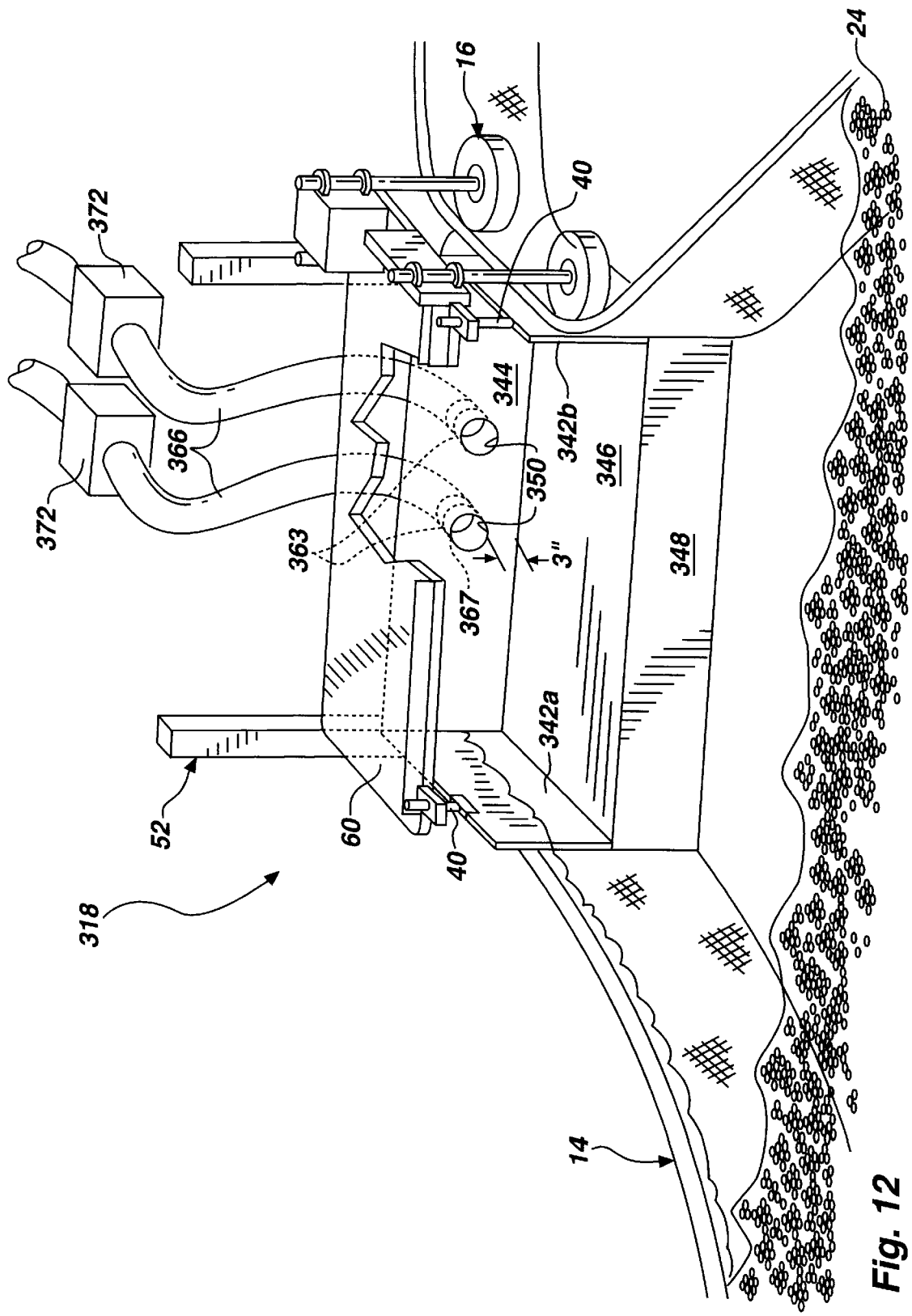
FIG. 12 is a perspective view of one alternative presently preferred embodiment of a collection assembly of the apparatus for harvesting and cleaning brine shrimp eggs.
Figure 13:
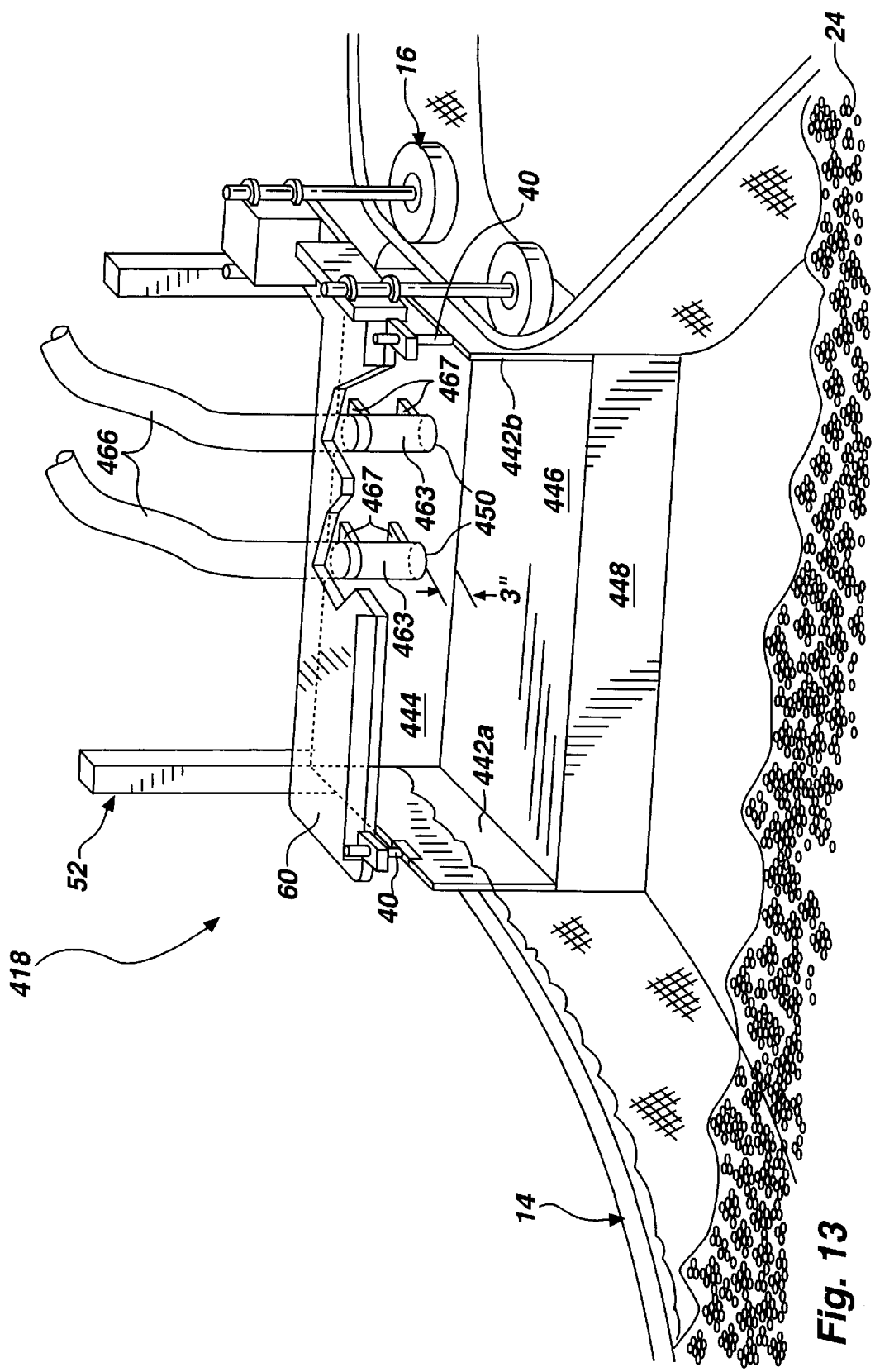
FIG. 13 is a perspective view of another alternative presently preferred embodiment of a collection assembly of the apparatus for harvesting and cleaning brine shrimp eggs.

Alternative presently preferred embodiments of the collection assembly of the present invention are shown in FIGS. 12 and 13. The collection assemblies of FIGS. 12 and 13 may be constructed similarly to the earlier disclosed collection assemblies with the modifications hereinafter described.

As shown in FIG. 12, in one presently preferred embodiment, the collection assembly or collection device 318 preferably includes a base member 346, as well as means for extracting brine shrimp eggs and means for positioning the extraction means as will be understood more fully hereafter.

The base member 346 is preferably positioned in a substantially horizontal orientation with respect to the surface of the body of water, as shown in FIG. 12. The horizontal orientation of the base member 346 facilitates entry of the brine shrimp eggs into the collection assembly 318 for their subsequent extraction from the body of water.

As mentioned, the collection assembly 318 further includes means for extracting the brine shrimp eggs from the body of water. The extraction means serves to extract or remove brine shrimp eggs from the body of water, thereby accomplishing a harvest of the brine shrimp eggs.

Presently preferred embodiments of the extraction means of the present invention will now be described referring to FIGS. 12 and 13.

As an important feature of the present invention, means for positioning the extraction means are provided so as to position the extraction means at least three inches vertically from the base member 346. Accordingly, in one presently preferred embodiment of the collection assembly 318, the extraction means is permanently disposed at least three inches vertically from the base member 346. As a result, the extraction means typically will not function properly to extract brine shrimp eggs from the body of water unless the base member 346 is disposed at least three inches below the upper surface of the brine shrimp eggs, and, practically speaking, the surface of the water. Because the egg mud mixture 24 floats at the upper surface of the body of water, the upper surface of the brine shrimp eggs typically coincides roughly with the surface of the body of water. Thus, in effect, the extraction means typically will not function properly to extract brine shrimp eggs from the body of water unless the base member 346 is disposed at least three inches below the surface of body of water.

As shown in FIG. 12, the collection assembly 318 preferably further includes a back wall 344 positioned at an angle to the base member 346. The back wall 344 is preferably connected to and positioned substantially perpendicular to the base member 346 so as to form an L-shape. Thus, in one presently preferred embodiment, the angle between the back wall 344 and base member 346 is about 90 degrees. The back wall 344 serves to contain and hold the brine shrimp egg mud mixture 24 for its subsequent extraction, thereby substantially preventing the mixture 24 from simply traveling under the boat 12.

As illustrated in FIG. 12, in one presently preferred embodiment, the extraction means includes one or more openings 350 in the back wall 344 for allowing passage of the brine shrimp eggs therethrough. Although two openings 350 are shown in FIG. 12, any number of openings (including only one) could be disposed on the back wall 344.

In the preferred embodiment of FIG. 12, the extraction means includes two substantially similar openings 350. The openings 350 are each positioned at least three inches vertically from the base member 346, and in one presently preferred embodiment, are at from about three inches to about three and one half inches therefrom.

A conduit 366 and a coupling member 363 are provided to facilitate extraction of the brine shrimp eggs. In one presently preferred embodiment, the coupling member 363 is capable of releasable connection to the conduit 366. The coupling member 363 functions to operably connect the conduit 366 to the opening 350.

In one presently preferred embodiment, as shown in FIG. 12, the opening 350 is formed in one end of the coupling member 363. In addition, the coupling member 363 may be formed as a substantially rigid, hollow pipe connected to the back wall 344 such that the opening 350 leads into the coupling member 363. The conduit 366 may be flexible tubing capable of being stretched and placed over the end of the coupling member 363 distal the opening 350. It will be appreciated by those skilled in the art that a variety of fasteners may be used to more securely connect the conduit 366 to the coupling member 363. For example, a clamp (not shown) or an adjustable metal ring (not shown) may be used to secure the conduit 366 to the coupling member 363.

In the embodiment of FIG. 12, a weld 367 connects the coupling member 363 to the back wall 344 so as to provide means for rigidly and permanently positioning the coupling member 363 with respect to the base member 346. The diameter of the conduit 366 may be substantially similar to the diameter of the opening 350 such that the weld 367 connects the opening 350 and conduit 366 to form a substantially uniform channel.

Thus configured, the opening 350, coupling member 363, and conduit 366 create a channel capable of transporting extracted brine shrimp eggs therethrough. Preferably a pump 372 is also provided to facilitate extraction of the brine shrimp eggs. As seen in FIG. 12, the pump 372 is connected to conduit 366 so as to be in fluid communication therewith. The pump 372 operates to provide suction to the opening 350 to thereby extract brine shrimp eggs from the body of water.

As shown in FIG. 12, in one presently preferred embodiment, the extraction means for removing brine shrimp eggs from a body of water includes dual and symmetrical extraction systems(two openings 350, two conduits 366, two pumps 372, etc.). However, it will be appreciated by one skilled in the art that only one extraction system is required for proper operation of the collection assembly. The embodiment illustrated in FIG. 13 also includes dual extraction systems.

To further contain and hold the brine shrimp egg mud mixture 24, the collection assembly 318 may further comprise two opposing side walls 342a, 342b connected to the base member 346. In the embodiments illustrated in FIGS. 12 and 13, the side walls 342a, 342b are substantially perpendicular to the back wall 344 and substantially parallel to each other. It will be appreciated, however, that the side walls 342a, 342b may be oriented differently if desired, as shown by the configuration of the side walls 42a, 42b in FIG. 3.

The collection assembly 318 may also include a lip 348 connected to the base member 346 so as to extend downwardly and form an L-shape therewith. The lip 348 functions to substantially keep the egg mud mixture 24 from traveling under the boat.

FIG. 13 illustrates an alternative presently preferred embodiment of the collection assembly 418 of the present invention. As shown, the extraction means includes an opening 450 disposed at least three inches (and in one presently preferred embodiment, from about three inches to about three and one half inches) vertically from the base member 446 such that the opening 450 is substantially parallel to the base member 446.

A conduit 466 and a coupling member 463 are preferably also provided. In one presently preferred embodiment, the coupling member 463 is capable of releasable connection to the conduit 466. The opening 450 of the extraction means may be an opening 450 formed in one end of the coupling member 463. The coupling member 463 and conduit 466 may be formed similarly to the coupling member 363 and conduit 366 of FIG. 12 in that the conduit 466 may be a flexible tube capable of being placed onto the rigid coupling member 463.

As can be seen in FIG. 13, the coupling member 463 may be placed in a substantially vertical orientation. An advantage of this extraction means is that, with the opening 450 being parallel to the base member 446, a substantial portion of the area of the opening 450 is in contact with the brine shrimp egg mud mixture 24, thereby utilizing most of the opening 450 in extracting the mud mixture 24.

In presently preferred embodiments of the present invention, the extraction means may include the structures as discussed with reference to FIGS. 12 and 13. However, it will be understood that the extraction means may also take the form of other structures that may be used to extract brine shrimp eggs from a body of water. For example, the extraction means may include, in an alternate embodiment, a conveyor-belt type of system (not shown) for extracting brine shrimp eggs. Such a conveyor-belt type of system may include a rotating belt having scoops thereon disposed such that, when the belt is rotated, the scoops dip into the water, wherein the scoops are at least three inches above the base member 346, and scoop out brine shrimp eggs and deliver them to an awaiting container.

The positioning means of FIG. 13 may include one or more mounting brackets 467 connecting the coupling member 463 to the back wall 444. The mounting bracket 467, in one presently preferred embodiment, is a rigid metal bracket welded to the back wall 444 and welded to the coupling member 463 thereby rigidly connecting the back wall 444 and the coupling member 463. It will be appreciated that those skilled in the art could use a variety of configurations to achieve the positioning means.

A pump (not shown) may also be provided in fluid communication with the conduit 466. The pump may provide suction to the conduit 466 for extracting brine shrimp eggs from the body of water.

The collection assembly 418 may include two opposing side walls 442a, 442b, similar to the collection assembly 318 of FIG. 12. In one presently preferred embodiment, the side walls 442a, 442b may be substantially perpendicular with the back wall 444 and substantially parallel to each other.

The collection assemblies 318, 418 of FIGS. 12 and 13, may also include other structural elements as discussed in relation to FIG. 3. Those elements have been like numbered in FIGS. 12 and 13. For example, a convention lift assembly 52, a platform 60, support members 40, a concentration member 14, and a boom retrieval member 16 may also be used with the collection assemblies 318, 418 or FIGS. 12 and 13.

The alternative preferred collection assemblies 318, 418 as illustrated in FIGS. 12 and 13 may be used with the apparatus 10 for harvesting brine shrimp eggs as discussed and disclosed herein. Such an apparatus 10 may function similarly to the harvesters associated with FIGS. 1–11, with the differences being in the alternative embodiments of the collection assemblies 318, 418. The collection assemblies 318, 418, as disclosed in FIGS. 12 and 13, may be used in combination with a floating support member 12 and a concentration member 14 for concentrating the eggs into a concentrated egg mud mixture 24 prior to extraction of the eggs from the body of water. The apparatus 10 may also include a delivery system 22 for delivering the eggs to at least one porous container 144.

The collection assemblies 318, 418 may include bypass means, as disclosed and discussed in relation to FIG. 5, for allowing a portion of the egg mud mixture 24 to flow around the collection assembly 318, 418.

The apparatus 10 may also include a boom retrieval apparatus 16, or boom retrieval member 16, capable of operably engaging the containment boom 14 to retrieve the containment boom 14.

A method for harvesting brine shrimp eggs from a body of water may be used in combination with the collection assemblies 318, 418 of FIGS. 12 and 13. The method may include the steps of providing a collection device 318, 418 (or collection assembly) having a base member 346, 446; positioning the base member 346, 446 in a substantially horizontal orientation; providing means for extracting the brine shrimp eggs from the body of water such that the extraction means is at least three inches vertically from the base member 346, 446; positioning the base member 346, 446 so as to be below at least a portion of the eggs; and extracting the eggs from the body of water through the extraction means.

Before extracting the eggs from the body of water, the eggs may be concentrated into a concentrated egg mud mixture 24. The step of concentrating the eggs may be accomplished by substantially encircling the eggs with a containment boom 14.

The egg mud mixture 24 typically has a thickness of from about 7.5 cm to about 45 cm. Over the duration of harvesting brine shrimp eggs, meaning from the time a colony is encircled to when it is substantially harvested, the egg mud mixture 24 typically had an average thickness of from about 15 cm to about 20 cm.

As discussed earlier, once the eggs have been extracted from the body of water, they may be delivered to at least one porous container 144.

Also discussed earlier in relation to the collection assemblies 318, 418, a lip 348, 448 may be provided connected to the base member 346, 446 so as to extend downwardly to form an L-shape. The lip 348, 448 functions to substantially prevent the passage of the egg mud mixture 24 and included brine shrimp eggs under the base member 346, 446, and potentially under the boat 12.

The collection assemblies as shown in FIGS. 12 and 13 provide several benefits over the prior art collection assemblies. For example, the extraction means disposition at least three inches vertically from the base member provides more egg/debris mud mixture above the base member than egg above prior-art skimming devices. This allows larger quantities of brine shrimp eggs to be harvested from the collection assembly. In other words, the collection assembly of the present invention is capable of harvesting substantially larger quantities of brine shrimp eggs than the skimming devices of the prior art.

Another benefit of the collection assemblies of FIGS. 12 and 13 is that they allow any debris (such as sand) to sink away from the extraction means so that the debris is not funneled directly into the extraction means. Because there is at least three inches between the extraction means and the base member, the debris (such as sand) heavier than the brine shrimp eggs will tend to sink below the eggs. Accordingly, much of this heavier debris sinks below the extraction means and settles on the base member. Many prior art devices have openings at the same level or lower than the bottom floor of their collection system. With these prior art devices, the heavier debris is funneled directly into the opening. As pointed out, the presently preferred embodiments of the collection assemblies of FIGS. 12 and 13 allow the debris to sink away from the extraction means so that a more pure egg mud mixture may be harvested.

From the above discussion, it will be appreciated that the present invention provides novel apparatus and methods for harvesting and cleaning brine shrimp eggs which provide means for separating brine shrimp eggs from a concentrated egg/debris mud mixture, thereby depositing "clean" brine shrimp eggs into one or more porous container bags. Further, the present invention uses a concentration member for encircling, retaining and concentrating one or more floating colonies of brine shrimp eggs and debris for harvesting as a concentrated egg/debris mud mixture, without the need to manipulate a watercraft through a body of water in order to maneuver a leading edge for skimming the water surface. Similarly, the present invention may consist of a novel concentration member having a water-permeable skirt disposed in relation to a buoyant crown which allows for the passage of water therethrough, while being impermeable to the passage of brine shrimp eggs and/or debris.

Unlike the prior art, the present invention facilitates a more efficient mode of harvesting in relation to the time and labor expended by way of separating brine shrimp eggs from the unwanted debris collected as part of the concentrated egg/debris mud mixture, thus increasing overall productivity and competitive economic advantage. Moreover, the apparatus and techniques of the present invention simplify the harvesting process of the brine shrimp eggs.

Consistent with the foregoing, although the title of the present invention and the detailed description as herein provided are particularly focused on an application of the present invention to the harvesting and cleaning of brine shrimp eggs, it will be readily appreciated by those skilled in the art that the inventive principles set forth herein may be applied to the harvesting and cleaning of other materials or substances floating at or near the surface of a body of water. In particular, the features of the present invention may be readily adapted to collect and separate other types of floating materials or substances from a mixture. Therefore, it is intended that the presently preferred application of the present invention for harvesting and cleaning brine shrimp eggs as disclosed herein be viewed as exemplary of the principles of the present invention, and not as restrictive to a particular material or substance for implementing those principles.

Accordingly, the present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for harvesting brine shrimp eggs from a body of water, said method comprising the steps of:
   providing a collection device comprising a base member;
   positioning said base member in a substantially horizontal orientation;
   providing means for extracting said brine shrimp eggs from said body of water such that said extraction means is connected to said base member so as to be positioned at least three inches vertically from said base member;
   positioning said base member so as to be below at least a portion of said eggs; and
   extracting said eggs from said body of water through said extraction means.

2. The method for harvesting brine shrimp eggs as defined in claim 1, further comprising the step of concentrating said eggs into a concentrated egg mud mixture prior to extraction of said eggs from said body of water.

3. The method for harvesting brine shrimp eggs as defined in claim 2, wherein the step of concentrating said eggs comprises concentrating said eggs into said egg mud mixture using a containment boom.

4. The method for harvesting brine shrimp eggs as defined in claim 2, wherein said egg mud mixture is of a thickness of from about 7.5 cm to about 45 cm.

5. The method for harvesting brine shrimp eggs as defined in claim 4, wherein, over the duration of said harvesting, said egg mud mixture is of an average thickness of from about 15 cm to about 20 cm.

6. The method for harvesting brine shrimp eggs as defined in claim 1, further comprising the step of delivering said eggs to at least one porous container after extracting said eggs from said body of water.

7. The method for harvesting brine shrimp eggs as defined in claim 1, further comprising the step of providing a lip at a front portion of said base member so as to extend downwardly from said base member and form an L-shape therewith, thereby substantially preventing the passage of said eggs under said base member.

8. An apparatus for harvesting brine shrimp eggs from a body of water, said apparatus comprising:
   a floating support member;
   a collection assembly mounted to said floating support member, said collection assembly comprising:
      a base member which may be positioned in a substantially horizontal orientation;
      a back wall connected at an angle to said base member;
      means for extracting said brine shrimp eggs from said body of water; and
      means for connecting said extraction means to said collection assembly such that said extraction means is positioned at least three inches vertically from said base member; and
   a concentration member associated with said collection assembly for concentrating said eggs into a concentrated egg mud mixture prior to extraction of said eggs from said body of water.

9. The apparatus as defined in claim 8, wherein said back wall is connected to and positioned substantially perpendicular to said base member so as to form an L-shape.

10. The apparatus as defined in claim 8, wherein said concentration member comprises a containment boom.

11. The apparatus as defined in claim 10, wherein said containment boom further comprises a water-permeable skirt attached thereto.

12. The apparatus as defined in claim 10, further comprising a boom retrieval apparatus capable of operably engaging said containment boom to retrieve said containment boom.

13. The apparatus as defined in claim 8, wherein said collection assembly further comprises bypass means for allowing a portion of said egg mud mixture to flow around said collection assembly.

14. The apparatus as defined in claim 8, further comprising a delivery system for delivering said eggs to at least one porous container.

15. The apparatus as defined in claim 8, wherein said collection assembly further comprises two opposing side walls connected to said base member and a lip connected to a front portion of said base member so as to extend downwardly from said base member and form an L-shape therewith.

16. The apparatus as defined in claim 15, wherein both of said side walls are substantially perpendicular to said back wall and are substantially parallel to each other.

17. The apparatus as defined in claim 8, wherein said back wall is connected to and positioned substantially perpendicular to said base member so as to form an L-shape therewith, said collection assembly further comprising two opposing side walls connected to said base member, and wherein said extraction means comprises:
   an opening in said back wall for allowing passage of said brine shrimp eggs therethrough, said opening being positioned at least three inches vertically from said base member;
   a conduit and a coupling member capable of releasable connection to said conduit, wherein said opening in said back wall is in fluid communication with one end of said coupling member; and
   a pump in fluid communication with said conduit.

18. The apparatus as defined in claim 8, wherein said back wall is connected to and positioned substantially perpendicular to said base member so as to form an L-shape therewith, said collection assembly further comprising two opposing side walls connected to said base member, and wherein said extraction means comprises:
   an opening disposed at least three inches vertically from said base member and wherein said opening is substantially parallel to said base member;
   a conduit and a coupling member capable of releasable connection to said conduit, wherein said opening of said extraction means is an opening formed in one end of said coupling member; and
   a pump in fluid communication with said conduit.

19. The apparatus as defined in claim 8:
   wherein said back wall is connected to and positioned substantially perpendicular to said base member so as to form an L-shape therewith;
   wherein said collection assembly further comprises two opposing side walls connected to said base member wherein both of said side walls are substantially perpendicular to said back wall and are substantially parallel to each other;

wherein said concentration member comprises a containment boom;

and wherein said apparatus further comprises:
   a delivery system for delivering said eggs to at least one porous container; and
   a boom retrieval apparatus capable of operably engaging said containment boom to retrieve said containment boom.

20. The apparatus as defined in claim 19:
wherein said containment boom further comprises a water permeable skirt;

wherein said collection assembly further comprises bypass means for allowing a portion of said egg mixture to flow around said collection assembly; and wherein said collection assembly further comprises a lip connected to a front portion of said base member so as to extend downwardly from said base member and form an L-shape therewith.

21. The apparatus as defined in claim 8, further comprising a filtering assembly for separating the extracted brine shrimp eggs from other materials.

* * * * *